US012097703B2

(12) United States Patent
Tabata et al.

(10) Patent No.: US 12,097,703 B2
(45) Date of Patent: Sep. 24, 2024

(54) PIEZOELECTRIC ACTUATOR, LIQUID DISCHARGE HEAD, AND RECORDING DEVICE

(71) Applicant: KYOCERA CORPORATION, Kyoto (JP)

(72) Inventors: Shuhei Tabata, Kirishima (JP); Makoto Higashibeppu, Kirishima (JP); Takeshi Hirayama, Kirishima (JP); Yukihiro Hasegawa, Kirishima (JP); Gen Shimura, Kirishima (JP); Takashi Miyahara, Kirishima (JP); Atsushi Ishihara, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 212 days.

(21) Appl. No.: 17/788,293

(22) PCT Filed: Dec. 25, 2020

(86) PCT No.: PCT/JP2020/048750

§ 371 (c)(1),
(2) Date: Jun. 23, 2022

(87) PCT Pub. No.: WO2021/132571

PCT Pub. Date: Jul. 1, 2021

(65) Prior Publication Data

US 2023/0032270 A1 Feb. 2, 2023

(30) Foreign Application Priority Data

Dec. 26, 2019 (JP) ................................ 2019-236273

(51) Int. Cl.
*B41J 2/14* (2006.01)

(52) U.S. Cl.
CPC ....... *B41J 2/14233* (2013.01); *B41J 2/14209* (2013.01); *B41J 2002/14217* (2013.01);
(Continued)

(58) Field of Classification Search
CPC ................ B41J 2/14233; B41J 2/14209; B41J 2002/14217; B41J 2002/14258; B41J 2002/14306; B41J 2002/14491
See application file for complete search history.

(56) References Cited

U.S. PATENT DOCUMENTS 7,128,405 B2 * 10/2006 Suzuki ................ B41J 2/14209 347/71
8,132,897 B2 3/2012 Kojima et al.
(Continued)

FOREIGN PATENT DOCUMENTS

JP 2006158127 A 6/2006
JP 2009132075 A 6/2009
(Continued)

*Primary Examiner* — Geoffrey S Mruk
(74) *Attorney, Agent, or Firm* — HAUPTMAN HAM, LLP

(57) ABSTRACT

A piezoelectric actuator includes a common electrode on a piezoelectric layer at a first side adjacent to a first surface and extends over a plurality of piezoelectric elements. A plurality of first individual electrodes is on the piezoelectric layer at a second side adjacent to a second surface. Each of the plurality of first individual electrodes is at a piezoelectric element of the plurality of piezoelectric elements, and are not electrically connected together. A first insulating layer is on the common electrode at the first side and extends over the plurality of piezoelectric elements. A plurality of second individual electrodes is on the first insulating layer at the first side. Each of the plurality of second individual electrodes is at a piezoelectric element of the plurality of piezoelectric elements, and overlap centers of the plurality of first indi-
(Continued)

vidual electrodes. The plurality of second individual electrodes are electrically connected together.

11 Claims, 8 Drawing Sheets

(52) U.S. Cl.
CPC ................ *B41J 2002/14258* (2013.01); *B41J 2002/14306* (2013.01); *B41J 2002/14491* (2013.01)

(56) References Cited

U.S. PATENT DOCUMENTS

| | | | |
|---|---|---|---|
| 2009/0141092 | A1 | 6/2009 | Koide |
| 2011/0205314 | A1 | 8/2011 | Hibino |

FOREIGN PATENT DOCUMENTS

| | | | |
|---|---|---|---|
| JP | 201069618 | A | 4/2010 |
| JP | 2011167973 | A | 9/2011 |

* cited by examiner

2

13

PIEZOELECTRIC ACTUATOR, LIQUID DISCHARGE HEAD, AND RECORDING DEVICE

RELATED APPLICATIONS

The present application is a National Phase of International Application Number PCT/JP2020/048750, filed Dec. 25, 2020, and claims priority based on Japanese Patent Application No. 2019-236273, filed Dec. 26, 2019.

TECHNICAL FIELD

The present disclosure relates to a piezoelectric actuator, a liquid discharge head including the piezoelectric actuator, and a recording device including the liquid discharge head.

BACKGROUND ART

A piezoelectric actuator included in, for example, an inkjet head is known. For example, a piezoelectric actuator according to PTL 1 includes a piezoelectric layer, a common electrode provided on one of front and back surfaces of the piezoelectric layer, a plurality of individual electrodes provided on the other of the front and back surfaces of the piezoelectric layer, and a vibrating plate provided on the common electrode at a side opposite to the side at which the piezoelectric layer is provided. The common electrode overlaps the plurality of individual electrodes in see-through plan view, and a reference potential, for example, is applied thereto. A potential that differs from the reference potential (driving signal) is individually applied to each of the individual electrodes. Accordingly, portions of the piezoelectric layer that are provided between the common electrode and the individual electrodes expand or contract in directions along the piezoelectric layer. The expansion or contraction is regulated by the vibrating plate so that the piezoelectric actuator is bent. PTL 1 proposes use of an electrode that applies a voltage to the vibrating plate, which is formed of a piezoelectric material, to return the state of polarization of the vibrating plate to an initial state. This electrode is large enough to extend over the individual electrodes, and is provided on the vibrating plate at a side opposite to the side at which the common electrode is provided.

CITATION LIST

Patent Literature

PTL 1: Japanese Unexamined Patent Application Publication No. 2006-158127

SUMMARY OF INVENTION

A piezoelectric actuator according to an aspect of the present disclosure has a first surface and a second surface that faces away from the first surface, and includes a plurality of piezoelectric elements at a plurality of positions along the first surface. The piezoelectric actuator includes a piezoelectric layer, a common electrode, a plurality of first individual electrodes, a first insulating layer, and a plurality of second individual electrodes. The piezoelectric layer extends along the first surface. The common electrode is provided on the piezoelectric layer at a side adjacent to the first surface, and extends over the plurality of piezoelectric elements. The plurality of first individual electrodes are provided on the piezoelectric layer at a side adjacent to the second surface. The plurality of first individual electrodes are positioned individually at the plurality of piezoelectric elements, and are not electrically connected to each other. The first insulating layer is provided on the common electrode at a side adjacent to the first surface and extends over the plurality of piezoelectric elements. The plurality of second individual electrodes are provided on the first insulating layer at a side adjacent to the first surface. The plurality of second individual electrodes are positioned individually at the plurality of piezoelectric elements, and individually overlap centers of the plurality of first individual electrodes in see-through plan view. The plurality of second individual electrodes are electrically connected to each other.

A liquid discharge head according to another aspect of the present disclosure includes the above-described piezoelectric actuator and a flow passage member. The flow passage member has a pressurizing surface, a discharge surface, a plurality of pressurizing chambers, and a plurality of discharge holes. The pressurizing surface is provided on the first surface or the second surface. The discharge surface faces away from the pressurizing surface. The plurality of pressurizing chambers individually overlap the plurality of piezoelectric elements in a see-through plan view of the pressurizing surface. The plurality of discharge holes are individually connected to the plurality of pressurizing chambers and open in the discharge surface.

A recording device according to another aspect of the present disclosure includes the above-described liquid discharge head and a control unit. The control unit is electrically connected to the liquid discharge head and controls an operation of applying a reference potential to the common electrode and the plurality of second individual electrodes and individually inputting a driving signal to each of the plurality of first individual electrodes.

DESCRIPTION OF EMBODIMENTS

Figure 1A:
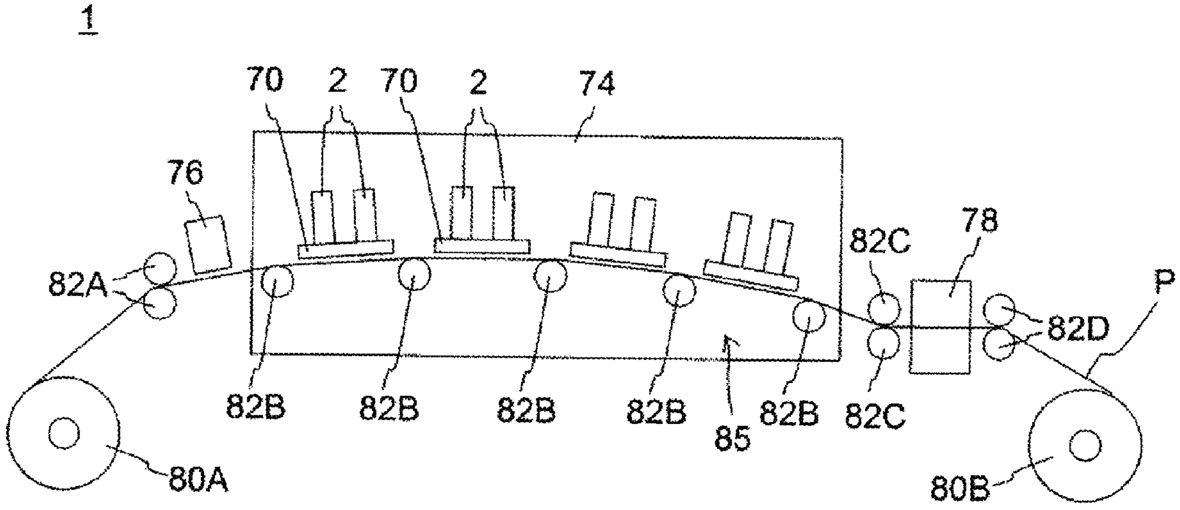
FIG. 1A is a side view of a recording device according to an embodiment of the present disclosure.

An embodiment of the present disclosure will be described with reference to the drawings. The drawings referred to below are schematic. Therefore, details may be omitted. The dimensional ratios in the drawings do not necessarily match the actual ones. The dimensional ratios in different drawings do not necessarily match each other.

Certain dimensions may be greater than the actual dimensions, and certain shapes may be exaggerated.

In the present disclosure, the term "similar" includes similar in a mathematical sense, but is not limited to this. In a mathematical sense, a shape that becomes congruent with another shape as a result of enlargement or reduction thereof (or without a change in scale) is similar to the other shape. However, shapes may be regarded as being similar when they are reasonably close to similar in a mathematical sense based on technical common sense. For example, when an ellipse has an outline positioned inward (or outward) from an outline of another ellipse by a constant and relatively short distance (for example, a distance of ¼ or less of the minimum diameter of the smaller ellipse), these ellipses are not similar in a mathematical sense because they have different ratios between the major and minor axes. However, shapes having such a relationship may also be regarded as being similar in the present disclosure.

In addition, in the present disclosure, the names of various shapes (for example, "circle", "ellipse", and "rectangle") show the shapes defined by the names in mathematics, but are not limited to this. For example, an ellipse may be any shape that is formed only of an outwardly convex curve and that has a long direction and a short direction that are generally orthogonal to each other. In addition, for example, a rectangle may have chamfered corners.

(Overall Structure of Printer)

Figure 1B:
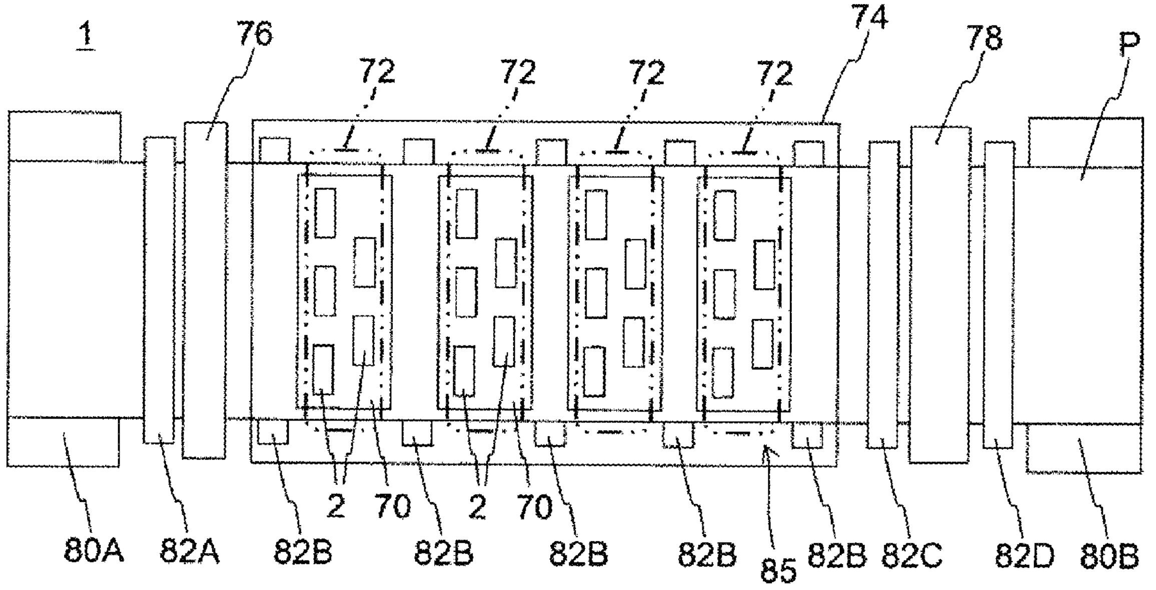
FIG. 1B is a plan view of the recording device illustrated in FIG. 1A.

FIG. 1A is a schematic side view of a color inkjet printer 1 (example of a recording device; hereinafter sometimes referred to simply as a printer) including liquid discharge heads 2 (hereinafter sometimes referred to simply as heads) according to an embodiment of the present disclosure. FIG. 1B is a schematic plan view of the printer 1.

Any direction of the heads 2 and the printer 1 may be the vertical direction. For convenience, the terms "upper surface", "lower surface", etc. may be used assuming that the up-down direction in FIG. 1A is the vertical direction. In addition, the terms "plan view" and "see-through plan view" mean views in the up-down direction in FIG. 1A unless specified otherwise.

The printer 1 transports printing paper P (example of a recording medium) from a paper feed roller 80A to a collection roller 80B so that the printing paper P moves relative to the heads 2. The paper feed roller 80A, the collection roller 80B, and various other rollers described below constitute a moving unit 85 that moves the printing paper P relative to the heads 2. A control unit 88 controls the heads 2 based on, for example, print data, which is data of images, characters, etc., and causes the heads 2 to discharge liquid toward the printing paper P. Thus, liquid droplets are deposited on the printing paper P to perform recording, such as printing, on the printing paper P.

According to the present embodiment, the heads 2 are fixed to the printer 1. The printer 1 serves as a so-called line printer. A recording device according to another embodiment may be a so-called serial printer that alternately performs an operation of causing the heads 2 to discharge liquid droplets while moving the heads 2 in a direction that crosses (for example, that is substantially orthogonal to) a transporting direction of the printing paper P, and an operation of transporting the printing paper P.

The printer 1 includes four flat plate-shaped head mounting frames 70 (hereinafter sometimes referred to simply as frames) that are fixed substantially parallel to the printing paper P. Each frame 70 has five holes (not illustrated) in which five heads 2 are mounted. The five heads 2 mounted on each frame 70 form a single head group 72. The printer 1 includes four head groups 72, and has a total of twenty heads 2 mounted thereon.

The heads 2 are mounted on the frames 70 such that liquid discharging portions thereof face the printing paper P. The distance between each head 2 and the printing paper P is, for example, about 0.5 mm to about 20 mm.

The twenty heads 2 may be directly connected to the control unit 88, or be connected to the control unit 88 through a distributer that distributes the print data. For example, the control unit 88 may transmit the print data to a single distributer, and the distributer may distribute the print data to the twenty heads 2. Alternatively, for example, the control unit 88 may distribute the print data to four distributers that correspond to the four head groups 72, and each distributer may distribute the print data to the five heads 2 that belong to the head group 72 corresponding thereto.

Each head 2 has an elongated shape that extends in the direction from the near side toward the far side in FIG. 1A, or in the up-down direction in FIG. 1B. In each head group 72, three heads 2 are arranged in a direction that crosses (for example, that is substantially orthogonal to) the transporting direction of the printing paper P, and each of the other two heads 2 is disposed between adjacent ones of the three heads 2 at a position shifted from the three heads 2 in the transporting direction. In other words, in each head group 72, the heads 2 are arranged in a staggered pattern. The heads 2 are arranged so that printable areas of the heads 2 are connected to each other or overlap at the ends thereof in a width direction of the printing paper P, that is, a direction that crosses the transporting direction of the printing paper P. Accordingly, printing can be performed without leaving gaps in the width direction of the printing paper P.

The four head groups 72 are arranged in the transporting direction of the printing paper P. Liquid (for example, ink) is supplied to each head 2 from a liquid supply tank (not illustrated). The heads 2 that belong to each head group 72 receive ink of the same color, and the four head groups 72 may be used to perform printing with inks of four colors. The colors of inks discharged from the head groups 72 may be, for example, magenta (M), yellow (Y), cyan (C), and black (K). These inks are deposited on the printing paper P to form a color image.

The number of heads 2 mounted in the printer 1 may be one if printing is performed using ink of a single color in a printable area of a single head 2. The number of heads 2 included in each head group 72 and the number of head groups 72 may be changed as appropriate in accordance with a printing object and printing conditions. For example, the number of head groups 72 may be increased to increase the number of colors used in printing. Alternatively, a plurality of head groups 72 for printing in the same color may be arranged and used for printing one after the other in the transporting direction. In such a case, the transport speed can be increased without changing the performance of the heads 2. Thus, a printing area per unit time can be increased. In addition, a plurality of head groups 72 for printing in the same color may be arranged at positions shifted from each other in a direction that crosses the transporting direction to increase the resolution in the width direction of the printing paper P.

The heads 2 may be used to process a surface of the printing paper P by applying liquid, such as a coating agent, uniformly or in a pattern by printing instead of performing printing using color inks. The coating agent may be, for example, an agent that forms a liquid receiving layer to facilitate fixation of liquid when the recording medium has low liquid permeability. Alternatively, the coating agent may be an agent that forms a liquid permeation reducing layer for suppressing spreading of liquid or mixture of liquids deposited at adjacent locations when the recording medium has high liquid permeability. The coating agent may be applied uniformly by a coating machine 76 controlled by the control unit 88 instead of being printed by the heads 2.

The printer 1 performs printing on the printing paper P, which is a recording medium. The printing paper P is wrapped around the paper feed roller 80A. The printing paper P is fed from the paper feed roller 80A, passes through a region below the heads 2 mounted on the frames 70, and then passes between two transport rollers 82C. Finally, the printing paper P is collected by the collection roller 80B. When printing is performed, the transport rollers 82C are rotated so that the printing paper P is transported at a constant speed, and the heads 2 print on the printing paper P.

Components of the printer 1 will now be described in the order of arrival of the printing paper P. The printing paper P fed from the paper feed roller 80A passes between two guide rollers 82A, and then passes through a region below the coating machine 76. The coating machine 76 applies the above-described coating agent to the printing paper P.

Next, the printing paper P enters a head chamber 74 that contains the frames 70 on which the heads 2 are mounted. The head chamber 74 defines a space that is partially connected to the outside through, for example, an entrance and an exit for the printing paper P, but is generally isolated from the outside. Control factors, such as the temperature, humidity, and air pressure, in the head chamber 74 are controlled by, for example, the control unit 88 as necessary. Since the influence of disturbance in the head chamber 74 is less than that in the outside where the printer 1 is installed, variation ranges of the above-described control factors may be narrower than those in the outside.

Five guide rollers 82B are disposed in the head chamber 74, and the printing paper P is transported above the guide rollers 82B. The five guide rollers 82B are arranged along a curve that is convex toward the frames 70 in a side view. Accordingly, the printing paper P transported above the five guide rollers 82B is curved in a side view, and receives a tension so that each portion of the printing paper P disposed between adjacent ones of the guide rollers 82B is flat. Two adjacent guide rollers 82B have one frame 70 disposed therebetween. The frames 70 are disposed at slightly different angles so that the frames 70 are parallel to the portions of the printing paper P transported therebelow.

The printing paper P that has left the head chamber 74 passes between the two transport rollers 82C, through a drying machine 78, and between two guide rollers 82D, and is collected by the collection roller 80B. The transport speed of the printing paper P is, for example, 100 m/min. The rollers may be either controlled by the control unit 88 or operated manually.

The printing paper P is dried by the drying machine 78 to reduce the possibility of adhesion between overlapping portions of the printing paper P that is wrapped around the collection roller 80B and reduce smudging of undried liquid. To increase the print speed, the drying speed also needs to be increased. To increase the drying speed, the drying machine 78 may use a plurality of drying systems that are executed successively or together. The drying systems are, for example, systems of blowing hot air, emitting infrared radiation, or bringing a heated roller into contact with the printing paper P. When infrared radiation is emitted, the emitted infrared radiation may have a specific frequency range so that the printing paper P may be quickly dried with small damage. When a heated roller is brought into contact with the printing paper P, the printing paper P may be transported along a cylindrical surface of the roller to increase the time for which heat is transmitted to the printing paper P. The area in which the printing paper P is transported along the cylindrical surface of the roller may be ¼ or more of the circumference of the cylindrical surface of the roller, and preferably ½ or more of the circumference of the cylindrical surface of the roller. When UV curable ink, for example, is printed, a UV radiation light source may be provided instead of or in addition to the drying machine 78. The UV radiation light source may be disposed in each of regions between adjacent ones of the frames 70.

The printer 1 may include a cleaning unit that cleans the heads 2. The cleaning unit performs cleaning by, for example, wiping and/or capping. Wiping is performed by, for example, scraping surfaces, such as discharge surfaces 11*a* (described below), of the liquid discharging portions with flexible wipers to remove liquid that has adhered to the surfaces. Capping for cleaning is performed, for example, as follows. First, the liquid discharging portions, such as the discharge surfaces 11*a*, are covered with caps (capped) so that substantially sealed spaces are formed between the discharge surfaces 11*a* and the caps. In this state, liquid is repeatedly discharged to remove clogs, such as liquid with a viscosity higher than that in a normal state and foreign matter, from discharge holes 3 (described below). Since the liquid discharging portions are capped, the liquid does not easily scatter in the printer 1 or adhere to the printing paper P or transport mechanisms, such as rollers, during cleaning. The discharge surfaces 11*a* that have been cleaned may be wiped. Cleaning by wiping and/or capping may be performed manually by using wipers and/or caps attached to the printer 1 or automatically by the control unit 88.

The recording medium may be, for example, rolled cloth instead of the printing paper P. Also, the printer 1 may transport a transport belt on which the recording medium is placed to transport the recording medium instead of directly transporting the printing paper P. In such a case, a cut sheet of paper, a cut piece of cloth, a piece of wood, a tile, etc. may be used as the recording medium. The heads 2 may discharge liquid containing conductive particles to print a wiring pattern of an electronic device. Alternatively, the heads 2 may discharge a predetermined amount of liquid chemical agent or liquid containing a chemical agent into, for example, a reaction vessel to cause a reaction for producing chemicals.

The printer 1 may have, for example, a position sensor, a speed sensor, and/or a temperature sensor attached thereto, and the control unit 88 may control components of the printer 1 in accordance with the states of the components of the printer 1 determined from information obtained by the sensors. For example, the temperature of each head 2, the temperature of the liquid in the liquid supply tank that supplies the liquid to the head 2, and/or the pressure applied to the head 2 by the liquid in the liquid supply tank may affect the discharge characteristics (for example, the amount of discharge and/or discharge speed) of the liquid that is discharged. In such a case, a driving signal based on which the liquid is discharged may be changed in accordance with the obtained information.

(Discharge Surface)

Figure 2:
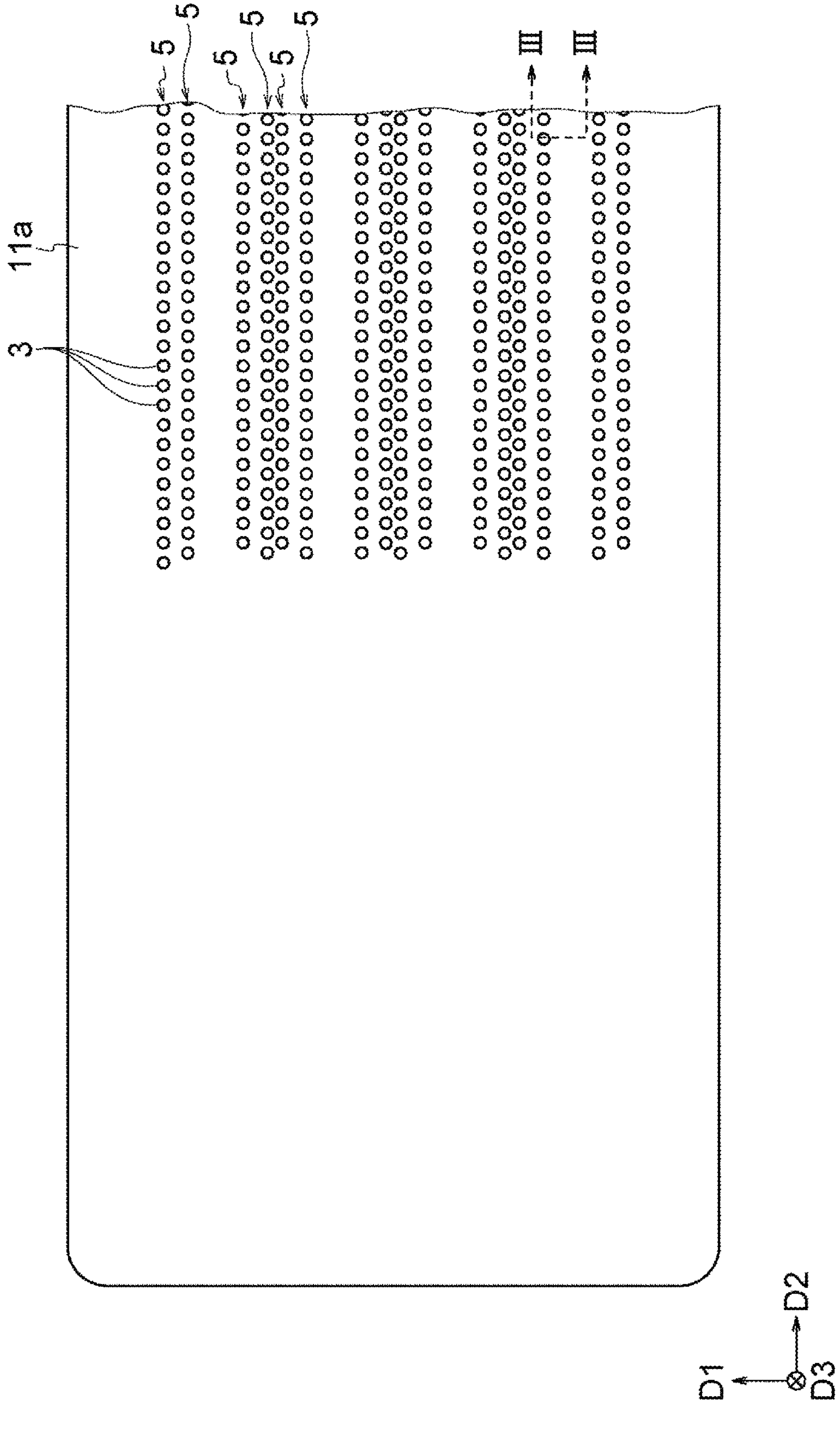
FIG. 2 is a plan view of a part of a liquid discharge head included in the recording device illustrated in FIG. 1A.

FIG. 2 is a plan view of a portion of a surface (discharge surface 11*a*) of each head 2 that faces the printing paper P. In FIG. 2, an orthogonal coordinate system having D1, D2, and D3 axes is defined for convenience. The D1 axis is parallel to the direction of relative movement between the head 2 and the printing paper P. The positive and negative sides of the D1 axis with respect to the direction in which the printing paper P is moved relative to the head 2 are not particularly limited in the present embodiment. The D2 axis is parallel to the discharge surface 11*a* and the printing paper P, and is orthogonal to the D1 axis. The positive and negative sides of the D2 axis are also not particularly limited. The D3 axis is orthogonal to the discharge surface 11*a* and the printing paper P. The negative D3 side (near side in FIG. 2) is the side in the direction from the head 2 toward the printing paper P. As described above, the head 2 is shaped such that a long direction thereof is the D2 direction. One end portion of the head 2 in the long direction is illustrated.

The discharge surface 11*a* is, for example, a flat surface that constitutes most of the surface of the head 2 that faces the printing paper P. The discharge surface 11*a* is generally rectangular, and a long direction thereof is the D2 direction. The discharge surface 11*a* has the discharge holes 3 from which ink droplets are discharged. The discharge holes 3 are disposed at different positions in the direction (D2 direction) orthogonal to the direction of relative movement between the head 2 and the printing paper P (D1 direction). Therefore, any two-dimensional image may be formed by discharging ink droplets from the discharge holes 3 while the head 2 and the printing paper P are moved relative to each other by the moving unit 85.

More specifically, the discharge holes 3 are arranged in a plurality of rows (16 rows in the illustrated example). In other words, the discharge holes 3 are arranged to form a plurality of discharge hole rows 5. The discharge holes 3 in different discharge hole rows 5 are displaced from each other in the D2 direction. Accordingly, a plurality of dots may be formed on the printing paper P such that the pitch thereof in the D2 direction is less than the pitch of the discharge holes 3 in each of the discharge hole rows 5. The head 2 may instead be configured to have only one discharge hole row 5.

The discharge hole rows 5 are, for example, generally parallel to each other and have the same length. In the illustrated example, the discharge hole rows 5 extend in the direction (D2 direction) orthogonal to the direction of relative movement between the head 2 and the printing paper P and are parallel to each other. The discharge hole rows 5 may instead be at an angle with respect to the D2 direction. In addition, in the illustrated example, gaps between the discharge hole rows 5 (intervals in the D1 direction) are not equal. This is due to, for example, the arrangement of flow passages in the head 2. The gaps between the discharge hole rows 5 may, of course, instead be equal.

(Head Body)

Figure 3:
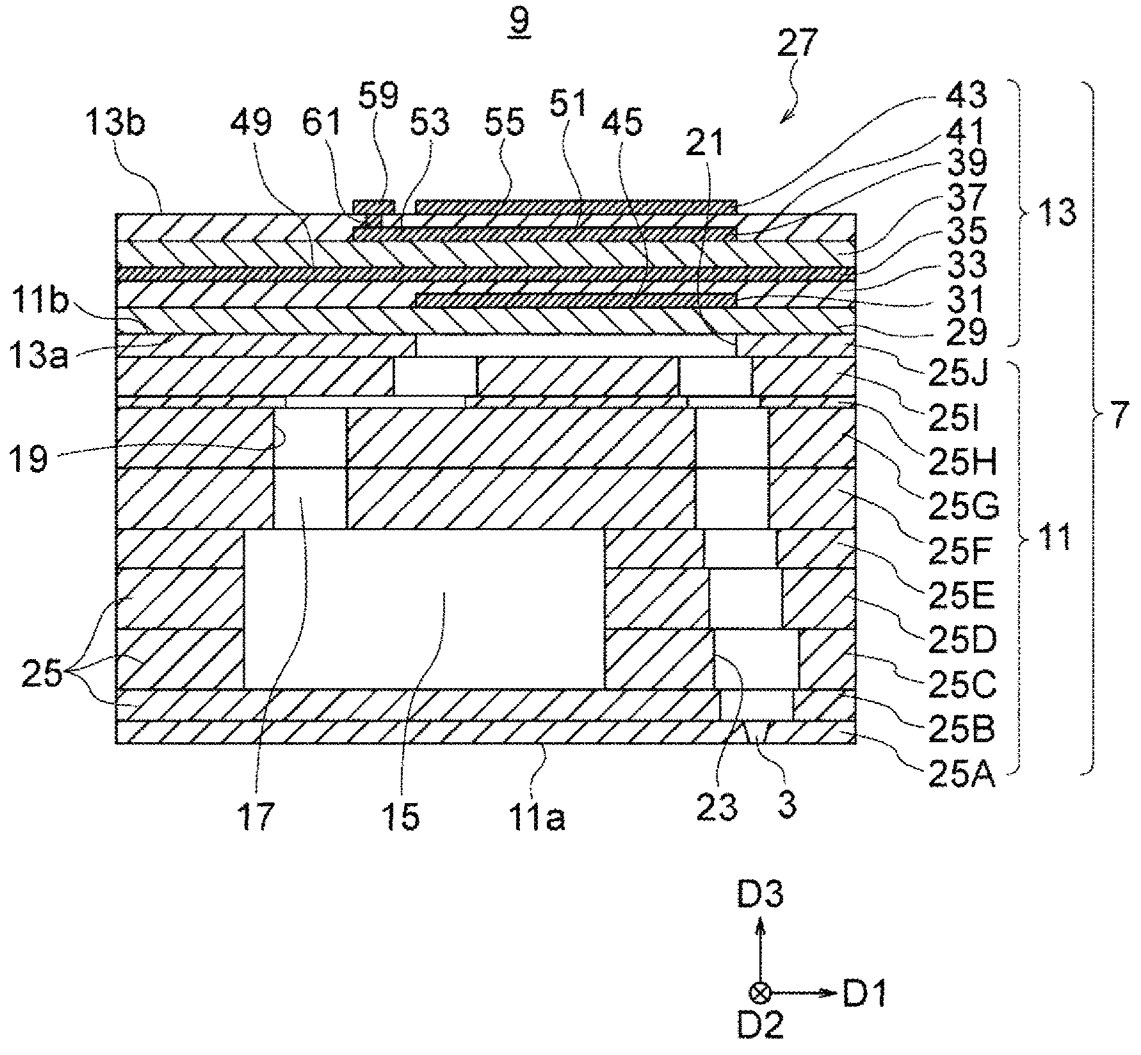
FIG. 3 is a sectional view of FIG. 2 taken along line III-III.

FIG. 3 is a sectional view of FIG. 2 taken along line III-III. The printing paper P is positioned at the bottom of FIG. 3. The structure of a portion including one discharge hole 3 is mainly illustrated. In addition, a head body 7, which is a portion of the head 2 having the discharge surface 11*a*, is illustrated (in other words, only a portion adjacent to the discharge surface 11*a* is illustrated). The head body 7 may be regarded as a liquid discharge head.

The head body 7 is a generally plate-shaped member, and one of the front and back surfaces of the plate shape serves as the above-described discharge surface 11*a*. The thickness of the head body 7 is, for example, 0.5 mm or more and 2 mm or less. The head body 7 is a piezoelectric head that discharges liquid droplets by causing mechanical strain of piezoelectric elements and applying pressure to the liquid. The head body 7 includes a plurality of discharge elements 9 having the discharge holes 3. The discharge elements 9 and elements associated with the discharge elements 9 (for example, wiring lines connected to the discharge elements 9) basically have the same structures. The discharge elements 9 are two-dimensionally arranged along the discharge surface 11*a*.

From another point of view, the head body 7 includes a generally plate-shaped flow passage member 11 in which flow passages for the liquid (ink) are formed and a piezoelectric actuator 13 that applies pressure to the liquid in the flow passage member 11. The discharge elements 9 are formed of the flow passage member 11 and the piezoelectric actuator 13. The discharge surface 11*a* is a surface of the flow passage member 11. The surface of the flow passage member 11 at a side opposite to the side of the discharge surface 11*a* will be referred to as a pressurizing surface 11*b*.

The flow passage member 11 includes a common flow passage 15 and a plurality of individual flow passages 17 connected to the common flow passage 15 (only one individual flow passage 17 is illustrated in FIG. 3). Each individual flow passage 17 has one of the above-described discharge holes 3, and includes a connection flow passage 19, a pressurizing chamber 21, and a partial flow passage 23 arranged in that order from the common flow passage 15 to the discharge hole 3.

The individual flow passages 17 and the common flow passage 15 are filled with the liquid. The capacities of the pressurizing chambers 21 are changed to apply pressure to the liquid so that the liquid flows from the pressurizing chambers 21 to the partial flow passages 23 and that liquid droplets are discharged from the discharge holes 3. The liquid is supplied to the pressurizing chambers 21 from the common flow passage 15 through the connection flow passages 19.

The flow passage member 11 is formed by, for example, stacking a plurality of plates 25A to 25J (letters A to J may sometimes be omitted). The plates 25 have a plurality of holes (mainly through holes but may instead be recesses) that form the individual flow passages 17 and the common flow passage 15. The number and thicknesses of the plates 25 may be set as appropriate in accordance with, for example, the shapes of the individual flow passages 17 and the common flow passage 15. The plates 25 may be made of any appropriate material. For example, the plates 25 are made of a metal or a resin. The thicknesses of the plates 25 are, for example, 10 μm or more and 300 μm or less. The plates 25 are, for example, fixed to each other by an adhesive (not illustrated) provided therebetween.

(Shapes of Flow Passages)

The shapes, dimensions, etc. of the flow passages in the flow passage member 11 may be set as appropriate, and are as follows in the illustrated example.

The common flow passage 15 extends in the long direction of the head 2 (direction orthogonal to the page in FIG. 3). Although only one common flow passage 15 may be provided, a plurality of common flow passages 15, for example, may be provided and arranged parallel to each other. The common flow passages 15 have a rectangular cross sectional shape.

The individual flow passages 17 (discharge elements 9 from another point of view) are arranged along the length of each common flow passage 15. Accordingly, the discharge holes 3 of the individual flow passages 17 are also arranged along the common flow passage 15. In the arrangement of the discharge holes 3 illustrated in FIG. 2, for example, two rows of discharge holes 3 may be provided on each side of each common flow passage 15. Thus, a total of 16 rows of discharge holes 3 may be provided along four common flow passages 15.

Each pressurizing chamber 21 opens in, for example, the pressurizing surface 11*b*, and is covered with the piezoelectric actuator 13. The pressurizing chamber 21 may instead be covered with one of the plates 25. This depends on whether the plate 25 that covers the pressurizing chamber 21 is regarded as a portion of the flow passage member 11 or a portion of the piezoelectric actuator 13. In either case, each pressurizing chamber 21 is positioned closer to the pressurizing surface 11*b* than to the discharge surface 11*a*.

The pressurizing chambers 21 may have, for example, the same shape. The shape of each pressurizing chamber 21 may be set as appropriate. For example, each pressurizing chamber 21 may have a thin shape with a uniform thickness that extends along the pressurizing surface 11*b*. Each pressurizing chamber 21 may instead have portions with different thicknesses. The thin shape is, for example, a shape with a thickness less than the diameter thereof in any direction in plan view.

The plan-view shape of each pressurizing chamber 21 may be, for example, a shape having a long direction and a short direction that are orthogonal to each other (for example, a rhombic or elliptical shape) (illustrated example), or a shape that does not have such directions (for example, a circular shape). The relationship between the long-side and short directions and the arrangement of the pressurizing chambers 21 is not limited.

In the description of the present embodiment, a shape obtained by combining a circle and an ellipse will be described below as an example. From another point of view, a shape having a long direction and a short direction will be described as an example. In the illustrated example, the left-right direction in FIG. 3 is the long direction of each pressurizing chamber 21. This direction is, for example, a direction that crosses (for example, that is orthogonal to) the direction in which each common flow passage 15 extends. From another point of view, the direction is the short direction of the head body 7.

Each partial flow passage 23 extends from the corresponding pressurizing chamber 21 toward the discharge surface 11*a*. The partial flow passage 23 is generally cylindrical. The partial flow passage 23 may extend from the pressurizing chamber 21 toward the discharge surface 11*a* obliquely (illustrated example) or not obliquely with respect to the up-down direction. The cross sectional area of the partial flow passage 23 may vary in the up-down direction. In plan view, the partial flow passage 23 is connected to, for example, an end portion of the pressurizing chamber 21 in a predetermined direction (for example, long direction of the pressurizing chamber 21 in plan view).

Each discharge hole 3 opens in a portion of a bottom surface of the partial flow passage 23 (surface at a side opposite to the side at which the pressurizing chamber 21 is disposed). The discharge hole 3 is, for example, positioned generally at the center of the bottom surface of the partial flow passage 23. However, the discharge hole 3 may instead be displaced from the center of the bottom surface of the partial flow passage 23. The discharge hole 3 is tapered such that the diameter thereof decreases toward the discharge surface 11*a* in a longitudinal section. The discharge hole 3 may instead be partially or entirely reversely tapered.

Each connection flow passage 19 includes, for example, a portion that extends upward from an upper surface of the corresponding common flow passage 15, a portion that extends along the plates 25 from the upwardly extending portion, and a portion that extends upward from the portion extending along the plates 25 and that is connected to a lower surface of the pressurizing chamber 21. The portion extending along the plates 25 has a small cross-sectional area in a direction orthogonal to the flow direction, and serves as a so-called restrictor. In plan view, the connection flow passage 19 is connected to the lower surface of pressurizing chamber 21 at an end portion opposite to the end portion connected to the partial flow passage 23 across the center of the lower surface.

The above description of the arrangement of the discharge holes 3 referring to FIG. 2 may generally be applied to the arrangement of the pressurizing chambers 21. However, the arrangement of the pressurizing chambers 21 may differ from the arrangement of the discharge holes 3. For example, the flow passages 23 may have different shapes so that the arrangement of the pressurizing chambers 21 differs from the arrangement of the discharge holes 3. In addition, for example, unlike the discharge holes 3 illustrated in FIG. 2, the pressurizing chambers 21 may be arranged uniformly in both the D1 and D2 directions (such that the pitch of the rows of the pressurizing chambers 21 is constant), or such that the number of rows thereof is less than the number of discharge hole rows 5.

(Piezoelectric Actuator)

The piezoelectric actuator 13 is, for example, generally plate-shaped and is broad enough to extend over the pressurizing chambers 21. The piezoelectric actuator 13 has a first surface 13*a* and a second surface 13*b* as front and back surfaces of the plate shape. In the present embodiment, the first surface 13*a* is a surface provided on the pressurizing surface 11*b* of the flow passage member 11. The piezoelectric actuator 13 includes a plurality of piezoelectric elements 27, each of which corresponds to one of the discharge elements 9 (one of the pressurizing chambers 21) and applies pressure to the corresponding pressurizing chamber 21. In other words, the piezoelectric actuator 13 includes a plurality of piezoelectric elements 27 that are arranged along the first surface 13*a*.

Regions of the piezoelectric actuator 13 regarded as the piezoelectric elements 27 may be defined as appropriate. For example, the regions may be defined as regions in which U individual electrodes 51 described below are disposed, or as regions that overlap the pressurizing chambers 21 in see-through plan view.

The piezoelectric actuator 13 is formed by stacking a plurality of layer-shaped members that extend along the first surface 13*a*. More specifically, for example, the piezoelectric actuator 13 includes a DD insulating layer 29, a DD conductor layer 31, a D insulating layer 33, a D conductor layer 35, a piezoelectric layer 37, a U conductor layer 39, a U piezoelectric layer 41, and a UU conductor layer 43 in that order from the first surface 13*a* (from the flow passage member 11). Thus, when the piezoelectric layer 37 and the U piezoelectric layer 41 are each regarded as a type of insulating layer, the piezoelectric actuator 13 is composed of insulating layers and conductor layers that are alternately arranged, and includes a total of four insulating layers and four conductor layers. Although not illustrated in particular, the piezoelectric actuator 13 may include an insulating layer (for example, solder resist) that covers the UU conductor layer 43.

With regard to "DD", "D", "U", and "UU" in the names of the insulating layers and conductor layers, "D" indicates that the layers are closer to the first surface 13*a* than (on the down side of) the piezoelectric layer 37, and "U" indicates that the layers are closer to the second surface 13*b* than (on the up side of) the piezoelectric layer 37. The numbers of characters "D" and "U" are increased with increasing distance from the piezoelectric layer 37. These characters may be added to the names of portions included in the layers.

In each piezoelectric element 27, when a voltage is applied to the piezoelectric layer 37 by the D conductor layer 35 and the U conductor layer 39, the piezoelectric layer 37 expands and/or contracts in a planar direction thereof (direction along the front and back surfaces). The expansion and/or contraction is regulated by one or more of the other insulating layers. Accordingly, similarly to a bimetal, the piezoelectric element 27 is bent toward the first surface 13*a* and/or the second surface 13*b*. When the piezoelectric element 27 is bent in this manner, the capacity of the pressurizing chamber 21 is reduced and/or increased and pressure is applied to the liquid in the pressurizing chamber 21.

More specifically, in the description of the present embodiment, for example, the D insulating layer 33 and/or the DD insulating layer 29 regulates the expansion and/or contraction of the piezoelectric layer 37. In this case, when the piezoelectric layer 37 contracts, the piezoelectric element 27 is bent toward the first surface 13*a* (convexly toward the first surface 13*a*). When the piezoelectric layer 37 expands, the piezoelectric element 27 is bent toward the second surface 13*b* (concavely toward the first surface 13*a*).

When a voltage is applied to the U piezoelectric layer 41 by the U conductor layer 39 and the UU conductor layer 43, the U piezoelectric layer 41 expands and/or contracts in a planar direction thereof. More specifically, when the piezoelectric layer 37 expands in a planar direction in response to the voltage applied thereto, the U piezoelectric layer 41 also expands in response to the voltage applied thereto. Also, when the piezoelectric layer 37 contracts in a planar direction in response to the voltage applied thereto, the U piezoelectric layer 41 also contracts in response to the voltage applied thereto. Therefore, similarly to the piezoelectric layer 37, the expansion and/or contraction of the U piezoelectric layer 41 is regulated by the D insulating layer 33 and/or the DD insulating layer 29, and is bent in the same direction as the direction in which the piezoelectric layer 37 is bent.

Accordingly, compared to an embodiment in which a single piezoelectric layer having a thickness equal to the total thickness of the piezoelectric layer 37 and the U piezoelectric layer 41 is provided (this embodiment may also be included in the technology of the present disclosure), the distance between the electrodes that sandwich the piezoelectric layers is reduced by half. Accordingly, the intensity of the electric fields applied to the piezoelectric layers is increased, and the amount of displacement of the piezoelectric element 27 can be increased as a result. In addition, compared to an embodiment in which the U piezoelectric layer 41 is omitted and only the piezoelectric layer 37 is provided (this embodiment may also be included in the technology of the present disclosure), the total thickness of the piezoelectric layers that are displaced is increased. Accordingly, the force applied to bend the multilayer body including the piezoelectric layers and the insulating layers can be increased.

The DD conductor layer 31 that has not been referred to in the above description of the bending deformation contributes to, for example, reduction in unintended stress and/or strain in the piezoelectric actuator 13. Such stress and/or strain may be caused by, for example, a temperature change during manufacture and/or during use. More specifically, for example, when the piezoelectric actuator 13 expands and/or contracts in a planar direction thereof due to a temperature change, the DD conductor layer 31 serves to balance the expansion and/or contraction at one side in the thickness direction (D3 direction) with the expansion and/or contraction at the other side.

In the present embodiment, as described above, the bending deformation is caused by regulating the expansion and/or contraction of the piezoelectric layers (37 and 41) with the layers closer to the first surface 13*a* than the piezoelectric layers. Therefore, the materials and thicknesses of the layers other than the piezoelectric layers are set so that when the piezoelectric layers expand and/or contract, the piezoelectric layers receive a greater stress from the side adjacent to the first surface 13*a* than from the side adjacent to the second surface 13*b*. Such a requirement may be satisfied by various combinations of materials and thicknesses, and the materials and thicknesses may be set as appropriate.

One example will be described. The conductor layers may have thicknesses less than the thicknesses of the insulating layers, so that the influence on the expansion and/or contraction of the piezoelectric layers (37 and 41) is reduced. The DD insulating layer 29 and the D insulating layer 33 may be made of the same piezoelectric material (for example, the same material as the material of the piezoelectric layer 37 and/or the U piezoelectric layer 41; a material having a relatively high Young's modulus from another point of view). The total thickness of the insulating layers (29 and 33) positioned closer to the first surface 13*a* than the piezoelectric layers (37 and 41) may be greater than the total thickness of insulating layers positioned closer to the second surface 13*b* than the piezoelectric layers (37 and 41) (no such insulating layers are present in the present embodiment). In such a structure, the piezoelectric layers (37 and 41) receive a greater stress from the side adjacent to the first surface 13*a* than from the side adjacent to the second surface 13*b*.

In the above-described structure, the thicknesses of the insulating layers may be set as appropriate. For example, the total thickness of the insulating layers (29 and 33) positioned closer to the first surface 13*a* than the piezoelectric layers (37 and 41) may be ½ or more and 3/2 or less of the total thickness of the piezoelectric layers (37 and 41).

In the illustrated example, the DD insulating layer 29, the D insulating layer 33, the piezoelectric layer 37, and the U piezoelectric layer 41 have generally the same thickness. In other words, the total thickness of the insulating layers (29 and 33) positioned closer to the first surface 13*a* than the piezoelectric layers (37 and 41) is generally equal to the total thickness of the piezoelectric layers (37 and 41). From another point of view, the total thickness of the insulating layers (29 and 33) positioned closer to the first surface 13*a* than the D conductor layer 35 is generally equal to the total thickness of the insulating layers (37 and 41) positioned closer to the second surface 13*b* than the D conductor layer 35.

Examples of dimensions in the above-described structure will now be described. The thickness of each of the DD insulating layer 29, the D insulating layer 33, the piezoelectric layer 37, and the U piezoelectric layer 41 may be 10 μm or more and 40 μm or less. The thickness of each of the DD conductor layer 31, the D conductor layer 35, the U conductor layer 39, and the UU conductor layer 43 may be 0.5 μm or more and 3 μm or less. The thickness of the D conductor layer 35 may be greater than the thicknesses of other conductor layers (for example, the U conductor layer 39) by 0.5 μm or more and 2 μm or less.

(Details of Layers of Piezoelectric Actuator)

Figure 4:
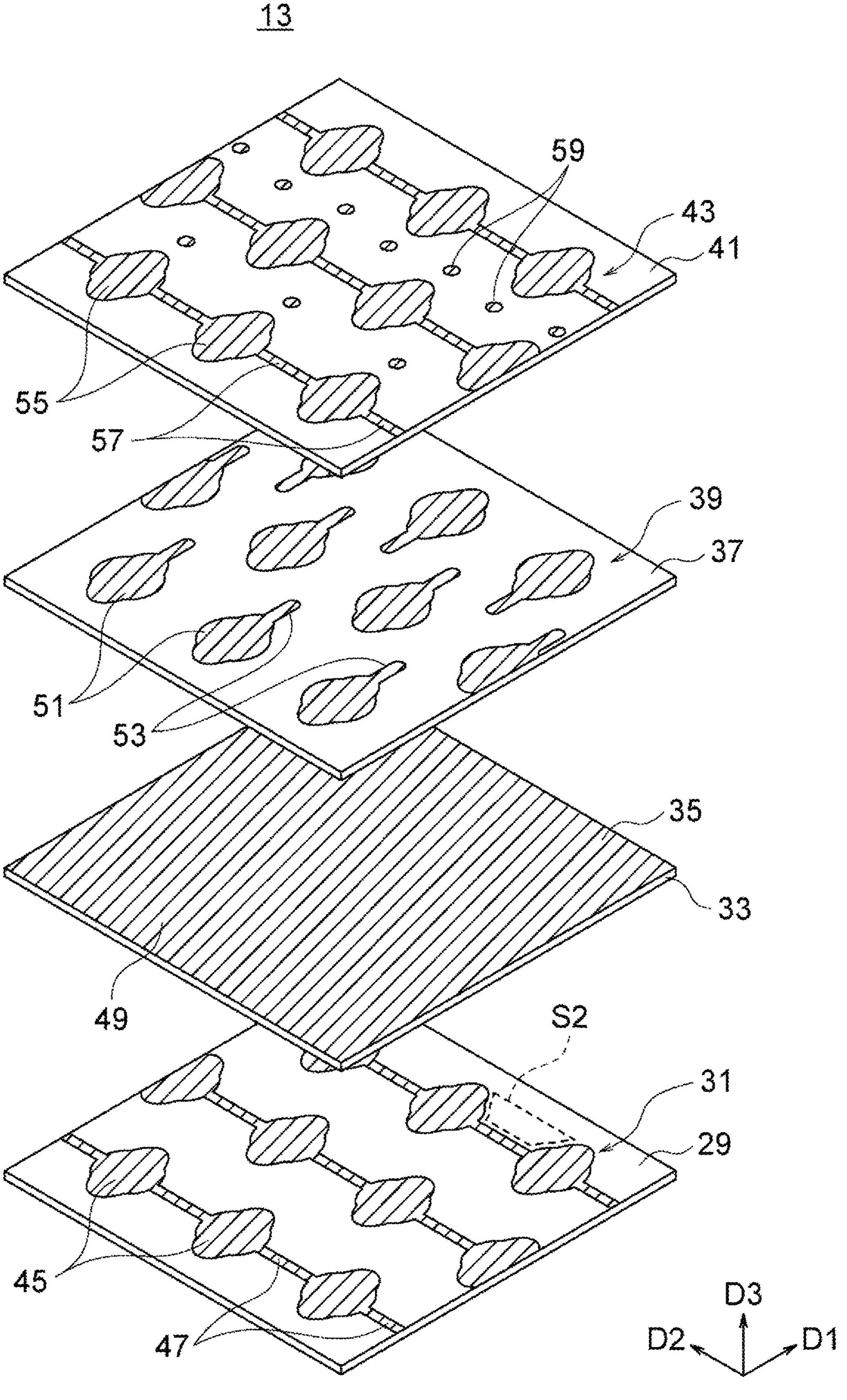
FIG. 4 is an exploded perspective view of a piezoelectric actuator included in the liquid discharge head illustrated in FIG. 2.
Figure 5:
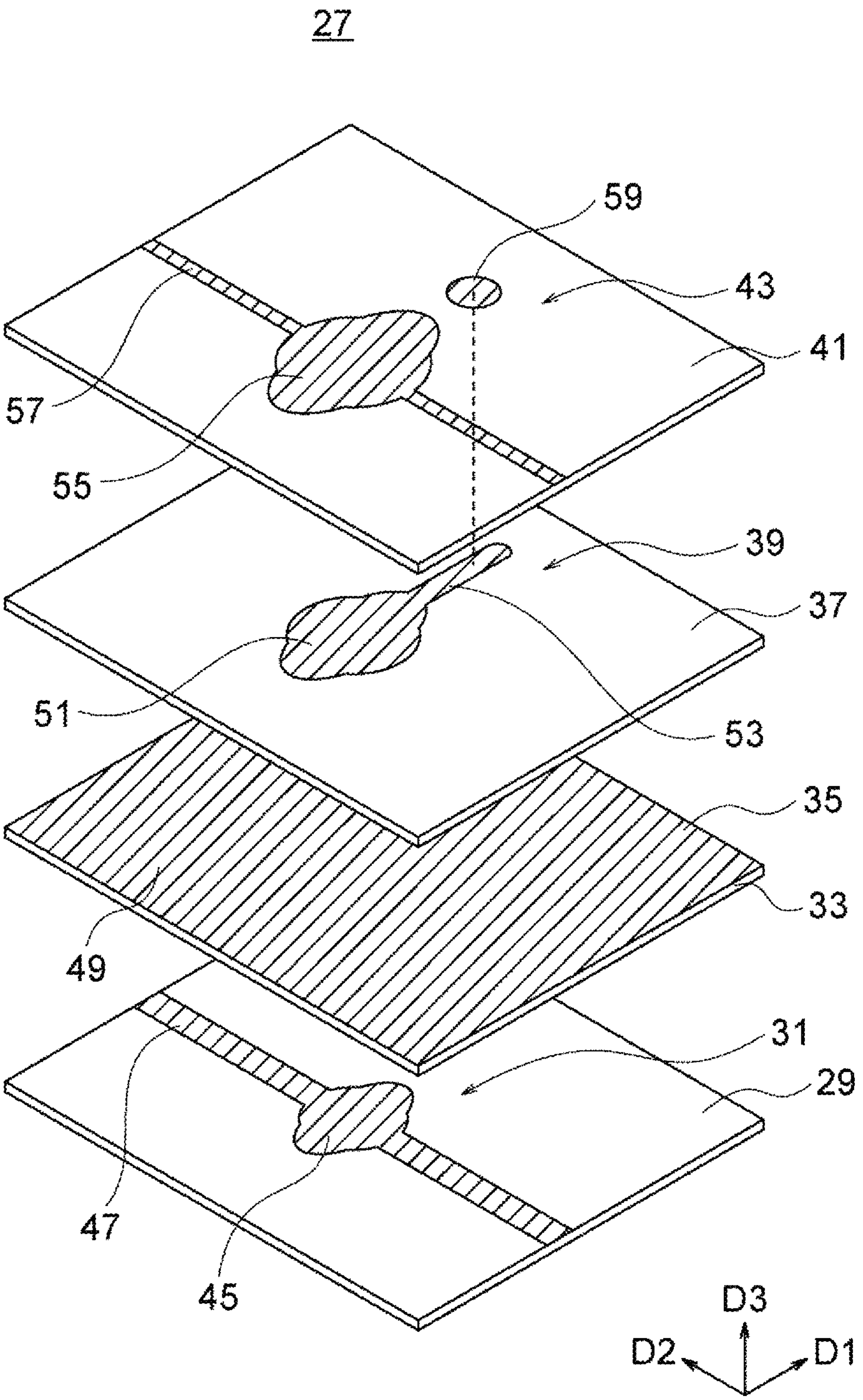
FIG. 5 is an enlarged partial view of FIG. 4.

FIGS. 4 and 5 are exploded perspective views of the piezoelectric actuator 13. FIG. 4 illustrates a portion of the piezoelectric actuator 13 in a region including plural piezoelectric elements 27. FIG. 5 illustrates a region including one piezoelectric element 27. In these figures, surfaces of the conductor layers (31, 35, 39, and 43) are cross-hatched for convenience.

These figures illustrate plate-shaped members which are each composed of a combination two layers, which are an insulating layer or a piezoelectric layer and a conductive layer stacked on the upper surface (surface at the positive D3 side) of the insulating layer or the piezoelectric layer. More specifically, four plate-shaped members are illustrated. This is for convenience of illustration, and does not mean that the four plate-shaped members are produced individually in the manufacturing process. For example, in the manufacturing process, each conductor layer may be formed on the lower surface (surface at the negative D3 side) of an insulating layer or a piezoelectric layer.

As illustrated in FIGS. 3 to 5, when the piezoelectric layers (37 and 41) are each regarded as a type of insulating layer, four insulating layers (29, 33, 37, and 41) extend over the piezoelectric elements 27 with substantially no gaps therein. The term "substantially" is used because the insulating layers may have, for example, through conductors (described below) for connecting the conductor layers to each other (this also applies hereinafter). The D conductor layer 35 also extends over the piezoelectric elements 27 with substantially no gaps therein. Other conductor layers (31, 39, and 43) include a plurality of portions (45, 51, and 53) that are positioned individually at (in other words, in one-to-one correspondence with) the piezoelectric elements 27.

The various layers (29, 31, 33, 35, 37, 39, 41, and 43) of the piezoelectric actuator 13 are shaped to have generally constant thicknesses when the regions where the conductor layers are not provided are ignored. The layers (29, 33, 35, 37, and 41) that extend over the piezoelectric elements 27 have, for example, the same area. From another point of view, the area of these layers may be equal to the area of the piezoelectric actuator 13. However, any of these layers may have an area less than that of other layers. For example, the D conductor layer 35 may be smaller than the D insulating layer 33 and the piezoelectric layer 37 on which the D conductor layer 35 is stacked so that the outer edge thereof is not exposed to the outside of the piezoelectric actuator 13.

Each layer may have an integral structure made of one type of material, or be formed by stacking different materials. Each layer is made of the same material at any position in a planar direction. However, each layer may include portions made of different materials in different regions.

(Piezoelectric Layers)

The piezoelectric layer 37 and the U piezoelectric layer 41 have polarization axes (referred to also as electrical axes or X axes in case of a single-crystal) that are generally parallel to the thickness direction (D3 direction) at least in regions in which the piezoelectric elements 27 are formed. The piezoelectric layer 37 and the U piezoelectric layer 41 are polarized (in a direction toward the positive or negative D3 side) such that the polarization directions thereof are opposite to each other. Each of the piezoelectric layers (37 and 41) contracts in a planar direction when a voltage is applied thereto in the same direction as the direction of polarization thereof along the thickness direction. In addition, each of the piezoelectric layers (37 and 41) expands in a planar direction when a voltage is applied thereto in a direction opposite to the direction of polarization thereof along the thickness direction. The piezoelectric layers (37 and/or 41) may be either polarized or not polarized in regions other than the regions in which the piezoelectric elements 27 are provided. When the piezoelectric layers (37 and/or 41) are polarized, the direction of polarization may be either the same as or different from the direction of polarization in the regions in which the piezoelectric elements 27 are formed.

The piezoelectric layer 37 and the U piezoelectric layer 41 may be made of, for example, a ferroelectric ceramic material. Examples of the ceramic material include lead-zirconate-titanate (PZT)-based, $NaNbO_3$-based, $BaTiO_3$-based, $(BiNa)TiO_3$-based, and $BiNaNb_5O_1$-based ceramic materials. However, the piezoelectric layers (37 and 41) may instead be made of a material other than the ceramic material. The material of the piezoelectric layers (37 and 41) may be a single-crystal, a polycrystal, an inorganic material, or an organic material. The material may or may not be a ferroelectric material, and may or may not be a pyroelectric material. The piezoelectric layer 37 and the U piezoelectric layer 41 may be made of the same material or different materials.

(Insulating Layers)

As described above, the thicknesses of the DD insulating layer 29 and the D insulating layer 33 may be set as appropriate. For example, these layers may have the same thickness or different thicknesses. In addition, the thickness of each layer may be less than, equal to, or greater than the thickness of the piezoelectric layer 37 and/or U piezoelectric layer 41.

As described above, the DD insulating layer 29 and the D insulating layer 33 may be made of any appropriate material. For example, the material of at least one of the insulating layers may be the same as or different from the material of the piezoelectric layer 37 and/or the U piezoelectric layer 41. In other words, the material of at least one of the insulating layers may or may not be a piezoelectric material. When the material of the insulating layers is a piezoelectric material that is the same as or different from the material of the piezoelectric layers, the above-described examples of the material of the piezoelectric layers may also be regarded as examples of the material of the insulating layers. When the insulating layers are made of a polycrystal, the insulating layers may or may not be polarized. The material of at least one of the insulating layers is, of course, not limited to a piezoelectric material.

(Conductor Layers)

The thicknesses of the DD conductor layer 31, the D conductor layer 35, the U conductor layer 39, and the UU conductor layer 43 may be set as appropriate. For example, these layers may have the same thickness or different thicknesses. The thickness of each layer is, for example, less than the thickness of the piezoelectric layer 37.

The DD conductor layer 31, the D conductor layer 35, the U conductor layer 39, and the UU conductor layer 43 may be made of the same material or different materials. The material of each conductor layer may be, for example, a metal material. Examples of the metal material include, for example, an Ag-Pd-based alloy and an Au-based alloy.

(D Conductor Layer)

As described above, for example, the D conductor layer 35 serves to apply a voltage to the piezoelectric layer 37. In the illustrated example (or in the illustrated region), the D conductor layer 35 includes only a common electrode 49. The common electrode 49 extends over the piezoelectric elements 27 with substantially no gaps therein. When the piezoelectric elements 27 are driven, a constant potential (potential that does not vary with time), for example, is applied to the common electrode 49. The constant potential is, for example, a reference potential (ground potential).

(U Conductor Layer)

As described above, for example, the U conductor layer 39 serves to apply a voltage to the piezoelectric layer 37 and the U piezoelectric layer 41. The U conductor layer 39 includes, for example, the U individual electrodes 51 that directly contribute to the application of the voltage and a plurality of U wiring lines 53 for applying a potential (driving signal) to each of the U individual electrodes 51 individually. The U individual electrodes 51 and the U wiring lines 53 are provided individually for the piezoelectric elements 27 (from another point of view, for the pressurizing chambers 21). Although not illustrated in particular, the U conductor layer 39 may include portions other than the above-described portions. For example, the U conductor layer 39 may include a reinforcing portion that extends along the outer edge of the piezoelectric layer 37 and/or the U piezoelectric layer 41.

When the piezoelectric elements 27 are driven, a constant potential (for example, a reference potential) is applied to the common electrode 49, and a driving signal with a potential that varies with time is input to each of the U individual electrodes 51. Accordingly, a voltage is applied to the piezoelectric layer 37 to cause a displacement of each of the piezoelectric elements 27. Each of the U individual electrodes 51 receives the driving signal individually. Therefore, each of the piezoelectric elements 27 is driven individually (in other words, independently).

The total area (or volume) of the U individual electrodes 51 and the U wiring lines 53 and the total area (or volume) of the U conductor layer 39 may be set as appropriate. In the illustrated example, the two totals are equal. In the following description, the two totals are not distinguished from each other, and the terms "one total" and "other total" are replaceable with each other.

(U Individual Electrodes)

The U individual electrodes 51 individually face the pressurizing chambers 21. The plan-view shape of the U individual electrodes 51 may be either similar (illustrated example) or not similar to the plan-view shape of the pressurizing chambers 21. In either case, the description of the plan-view shape of the pressurizing chambers 21 may be applied to the plan-view shape of the U individual electrodes 51. For example, the plan-view shape of the U individual electrodes 51 may be a shape having a long direction and a short direction that are orthogonal to each other (illustrated example) or a shape that does not have such directions. The relationship between the long-side and short directions and the arrangement of the U individual electrodes 51 is not limited.

The size of the U individual electrodes 51 may be set as appropriate. For example, in see-through plan view, the entire outline of each U individual electrode 51 may be positioned inside, generally on, or outside the outline of the corresponding pressurizing chamber 21 (more specifically, the opening of the pressurizing chamber 21 at a side adjacent to the pressurizing surface 11*b*). Alternatively, the outline of each U individual electrode 51 may be positioned such that only a portion thereof is on or inside the outline of the corresponding pressurizing chamber 21.

In the present embodiment, the plan-view shape of the U individual electrodes 51 is similar to the plan-view shape of the pressurizing chambers 21. The plan-view shapes are shapes having a long direction and a short direction that are orthogonal to each other. This will be described in detail below. In the present embodiment, in see-through plan view, each U individual electrode 51 and the corresponding pressurizing chamber 21 (plan-view shapes thereof) have generally the same center and are oriented in the same direction. In the illustrated example, the long direction of each U individual electrode 51 is the D1 direction (that is, the short direction of the piezoelectric actuator 13). The long direction of each U individual electrode 51 may instead be another direction (for example, the long direction of the piezoelectric actuator 13).

In the description of the present embodiment, a center of a planform (or a center in plan view or sectional view) means, for example, a centroid unless specified otherwise. The centroid is a barycenter of the planform, and is a point at which the moment of area about any axis that passes through the point is 0.

The above description of the arrangement of the pressurizing chambers 21 may be applied to the arrangement of the U individual electrodes 51. In the illustrated example, the U individual electrodes 51 are arranged in the long direction of the piezoelectric actuator 13 (D2 direction; from another point of view, the short direction of the U individual electrodes 51) in a plurality of rows (or one row). The rows that are adjacent to each other are shifted from each other in a direction parallel to the rows (D2 direction in this example) by half a pitch. In the case where the adjacent rows are shifted from each other by half a pitch, the adjacent rows may or may not partially overlap when viewed in a direction parallel to the rows.

(U Wiring Lines)

The U wiring lines 53 are shaped to project from the U individual electrodes 51, and serve as so-called lead electrodes. Each U wiring line 53 is connected to, for example, a through conductor 61 (FIG. 3) that extends through the U piezoelectric layer 41. Therefore, when a driving signal is input to the through conductor 61, the driving signal is input to the corresponding U individual electrode 51 through the U wiring line 53.

The shapes, dimensions, positions, etc. of the U wiring lines 53 may be set as appropriate. For example, each U wiring line 53 extends straight toward one side in a predetermined direction (D1 direction in the illustrated example) from an end portion of the corresponding U individual electrode 51 at the same side in the predetermined direction. The predetermined direction may be any direction, for example, the long direction of the U individual electrode 51 and/or the short direction of the piezoelectric actuator 13. Each U wiring line 53 has, for example, a generally constant width. Unlike the illustrated example, each U wiring line 53 may, of course, have a bent or curved portion. In addition, each U wiring line 53 may have an end portion wider than the other portion at the end opposite to the end connected to the corresponding U individual electrode 51.

(DD Conductor Layer)

As described above, the DD conductor layer 31 contributes to, for example, reduction in unintended stress and/or strain in the piezoelectric actuator 13. Similarly to the common electrode 49, when the piezoelectric elements 27 are driven, a constant potential (potential that does not vary with time), for example, is applied to the DD conductor layer 31. The constant potential may be, for example, a potential equal to the potential applied to the common electrode 49, or a reference potential (ground potential). When the piezoelectric elements 27 are driven, the DD conductor layer 31 may be in an electrically floating state with no potential applied thereto.

The DD conductor layer 31 includes, for example, a plurality of DD individual electrodes 45 that are positioned individually at the piezoelectric elements 27 and a plurality of DD wiring lines 47 that connect the DD individual electrodes 45 to each other. Although not illustrated in particular, the DD conductor layer 31 may include portions other than the above-described portions. For example, the DD conductor layer 31 may include a reinforcing portion that extends along the outer edge of the DD insulating layer 29 and/or the D insulating layer 33. The DD conductor layer 31 may instead be configured such that the DD wiring lines 47 that connect the DD individual electrodes 45 to each other are omitted. In this case, for example, the DD individual electrodes 45 may be arranged without being connected to each other. For example, a wiring line and a through conductor that extends through the D insulating layer 33 may be provided for each of the DD individual electrodes 45 so that the DD individual electrodes 45 are electrically connected to each other through the common electrode 49.

The total area (or volume) of the DD individual electrodes 45 and the DD wiring lines 47 and the total area (or volume) of the DD conductor layer 31 may be set as appropriate. In the illustrated example, the two totals are equal. In the following description, the two totals are not distinguished from each other, and the terms "one total" and "other total" are replaceable with each other. The above-described total area (or volume) may be less than, equal to, or greater than the total area (or volume) of the U conductor layer 39. For example, the total area (or volume) of the DD conductor layer 31 may be greater than or equal to half the total area (or volume) of the U conductor layer 39 and less than or equal to twice the total area (or volume) of the U conductor layer 39. When the total area (or volume) of the DD conductor layer 31 is greater or less than the total area (or volume) of the U conductor layer 39, the difference may be, for example, 1% or more or 50% or more of the total area (or volume) of the U conductor layer 39.

(DD Individual Electrodes)

As described above, the DD individual electrodes 45 (for example, all of the DD individual electrodes 45) are connected to each other by the DD wiring lines 47. Therefore, the potentials of the DD individual electrodes 45 are the same.

As is clear from the above description, in the present disclosure, "individual electrodes" are electrodes shaped to be separated from each other, and it is not necessary that different potentials be applied thereto. In addition, the individual electrodes are not necessarily completely separated from each other. It is only necessary that the individual electrodes have intervals therebetween. In other words, it is only necessary that the individual electrodes have regions with no conductor layer (regions free from the DD conductor layer 31 in the case of the DD individual electrodes 45) provided therebetween. For example, in the present embodiment, as illustrated in FIG. 4, although the DD individual electrodes 45 that are adjacent to each other in the D2 direction are connected to each other by the DD wiring lines 47 provided therebetween, gaps S2 are also provided therebetween. In the illustrated example, it is obvious that the DD individual electrodes 45 are separated from each other in directions other than the D2 direction.

The DD individual electrodes 45 individually face the U individual electrodes 51 (from another point of view, the pressurizing chambers 21). More specifically, in see-through plan view, each DD individual electrode 45 overlaps the center of the U individual electrode 51 corresponding thereto. Any region of the DD individual electrode 45 may overlap the center of the U individual electrode 51. For example, the center of the DD individual electrode 45 or a central region of the DD individual electrode 45 (for example, the middle one of three regions into which the DD individual electrode 45 is evenly divided in any direction) may overlap the center of the U individual electrode 51.

The DD individual electrodes 45 may have any shape. For example, the plan-view shape of the DD individual electrodes 45 may be either similar (illustrated example) or not similar to the plan-view shape of the U individual electrodes 51. In either case, the description of the plan-view shape of the U individual electrodes 51 may be applied to the plan-view shape of the DD individual electrodes 45. For example, the plan-view shape of the DD individual electrodes 45 may be a shape having a long direction and a short direction that are orthogonal to each other (illustrated example) or a shape that does not have such directions. The relationship between the long-side and short directions and the arrangement of the DD individual electrodes 45 is not limited.

The size of the DD individual electrodes 45 may be set as appropriate. For example, in see-through plan view, the entire outline of each DD individual electrode 45 may be positioned inside (illustrated example), generally on, or outside the outline of the corresponding U individual electrode 51. Alternatively, the outline of each DD individual electrode 45 may be positioned such that only a portion thereof is on or inside the outline of the corresponding U individual electrode 51. From another point of view, the area (or volume) of the DD individual electrodes 45 may be less than (illustrated example), equal to, or greater than the area (or volume) of the U individual electrodes 51. For example, the area (or volume) of the DD individual electrodes 45 may be greater than or equal to half the area (or volume) of the U individual electrodes 51 and less than or equal to twice the area (or volume) of the U individual electrodes 51. When the area (or volume) of the DD individual electrodes 45 is greater or less than the area (or volume) of the U individual electrodes 51, the difference may be, for example, 5% or more or 20% or more of the area (or volume) of the U individual electrodes 51.

In the present embodiment, the DD individual electrodes 45 and the U individual electrodes 51 have similar plan-view shapes, and the centers thereof generally coincide with each other in see-through plan view. In addition, in the present embodiment, in see-through plan view, the DD individual electrodes 45 and the U individual electrodes 51 have the centers that generally coincide with each other, and are oriented in the same direction. As is clear from the above discussion, the description of the arrangement of the U individual electrodes 51 may be applied to the arrangement of the DD individual electrodes 45. In addition, in the present embodiment, the entire outline of each DD individual electrode 45 is positioned inside the outline of the corresponding U individual electrode 51 (from another point of view, the area of the DD individual electrode 45 is less than the area of the U individual electrode 51).

(DD Wiring Lines)

The number, positions, shapes, dimensions, etc. of the DD wiring lines 47 may be set as appropriate. For example, the DD wiring lines 47 may connect the DD individual electrodes 45 that are adjacent to each other in the D2 direction (illustrated example) or connect the DD individual electrodes 45 that are adjacent to each other in a direction other than the D2 direction (D1 direction or a direction at an angle with respect to the D1 direction). Alternatively, the DD wiring lines 47 may provide a connection that is a combination of two or more of the above-described connections.

In addition, for example, the DD wiring lines 47 may extend straight (illustrated example) or be bent or curved. In addition, for example, the width of the DD wiring lines 47 may be generally constant in the length direction of the DD wiring lines 47 or vary depending on the position in the length direction. The width of the DD wiring lines 47 is less than the maximum diameter of the DD individual electrodes 45 in the width direction of the DD wiring lines 47 so that gaps (for example, the gaps S2) are provided between the DD individual electrodes 45. For example, the width of the DD wiring lines 47 may be ½ or less, ⅓ or less, or ¼ or less of the maximum diameter of the DD individual electrodes 45.

In the illustrated example, the DD wiring lines 47 connect the DD individual electrodes 45 that are adjacent to each other in the D2 direction. In addition, the DD wiring lines 47 are shaped to extend straight in the D2 direction and have a generally constant width. In the present embodiment, the direction in which the DD wiring lines 47 extend (D2 direction) is a direction that crosses (more specifically, that is orthogonal to) the direction in which the U wiring lines 53 extend, and is a direction that crosses (more specifically, that is orthogonal to) the long direction of the DD individual electrodes 45 (from another point of view, long direction of the pressurizing chambers 21).

(UU Conductor Layer)

As described above, for example, the UU conductor layer 43 serves to apply a voltage to the U piezoelectric layer 41. Similarly to the common electrode 49, when the piezoelectric elements 27 are driven, a constant potential (potential that does not vary with time), for example, is basically applied to the UU conductor layer 43 (for example, to portions other than pads 59 described below). The constant potential may be, for example, a potential equal to the potential applied to the common electrode 49 and/or the DD conductor layer 31, or a reference potential (ground potential).

When the common electrode 49 and the UU conductor layer 43 receive the same potential (for example, the reference potential) and a driving signal is input to the U conductor layer 39 (each U individual electrode 51), an electric field is applied to the piezoelectric layer 37 by the common electrode 49 and the U individual electrode 51, and another electric field is applied to the U piezoelectric layer 41 by the UU conductor layer 43 and the U individual electrode 51. The directions of the electric fields are opposite to each other. In addition, as described above, the directions of polarization of the piezoelectric layer 37 and the U piezoelectric layer 41 are opposite to each other. Therefore, the piezoelectric layer 37 and the U piezoelectric layer 41 expand or contract together. Thus, the piezoelectric elements 27 are driven.

The UU conductor layer 43 includes, for example, a plurality of UU individual electrodes 55 that are positioned individually at the piezoelectric elements 27, a plurality of UU wiring lines 57 that connect the UU individual electrodes 55 to each other, and the plurality of pads 59 that serve to apply a potential to the conductor layers (39, 35, and/or 31) below the U piezoelectric layer 41. Although not illustrated in particular, the UU conductor layer 43 may include portions other than the above-described portions. For example, the UU conductor layer 43 may include a reinforcing portion that extends along the outer edge of the U piezoelectric layer 41. The UU conductor layer 43 may be configured such that the UU wiring lines 57 that connect the UU individual electrodes 55 to each other are omitted. In this case, for example, the UU individual electrodes 55 may be arranged without being connected to each other. For example, a wiring line and a through conductor that extends through the U piezoelectric layer 41 and the piezoelectric layer 37 may be provided for each of the UU individual electrodes 55 so that the UU individual electrodes 55 are electrically connected to each other through the common electrode 49. Alternatively, for example, the UU individual electrodes 55 may be connected to each other through flexible printed circuits (FPC) (not illustrated) that face the second surface 13*b* of the piezoelectric actuator 13.

The total area (or volume) of the UU individual electrodes 55 and the UU wiring lines 57 (hereinafter sometimes referred to as the area (or volume) of main portions of the UU conductor layer 43) and the total area (or volume) of the UU conductor layer 43 may be set as appropriate. These total areas (or volumes) may be less than, equal to, or greater than at least one of the total area (or volume) of the U conductor layer 39 and the total area (or volume) of the DD conductor layer 31. For example, at least one of the total area (or volume) of the main portions the UU conductor layer 43 and the total area (or volume) of the UU conductor layer 43 may be greater than or equal to half the total area (or volume) of the U conductor layer 39 and less than or equal to twice the total area (or volume) of the U conductor layer 39. When the total area (or volume) of the main portions of the UU conductor layer 43 or the total area (or volume) of the UU conductor layer 43 is greater or less than the total area (or volume) of the U conductor layer 39, the difference may be, for example, 1% or more or 50% or more of the total area (or volume) of the U conductor layer 39.

(UU Individual Electrodes)

As is clear from FIGS. 4 and 5, in the present embodiment, the positions, shapes, and dimensions of the UU individual electrodes 55 are the same as or similar to the positions, shapes, and dimensions of the DD individual electrodes 45 (from another point of view, the U individual electrodes 51) except for the position in the D3 direction. Therefore, the above description of the DD individual electrodes 45 (or the U individual electrodes 51) may, for example, basically be applied to the UU individual electrodes 55.

For example, the plan-view shape of the UU individual electrodes 55 may be similar to the plan-view shape of the U individual electrodes 51. In addition, in see-through plan view, the UU individual electrodes 55 may overlap the centers of the U individual electrodes 51. More specifically, in see-through plan view, the UU individual electrodes 55 and the U individual electrodes 51 may have centers that generally coincide with each other, and be oriented in the same direction. The area (or volume) of the UU individual electrodes 55 may be less than, equal to, or greater than the area (or volume) of the U individual electrodes 51. The difference therebetween may be as described above.

More specifically, in the illustrated example, the area (or volume) of the UU individual electrodes 55 is greater than the area (or volume) of the U individual electrodes 51. In addition, as described above, in the illustrated example, the area (or volume) of the DD individual electrodes 45 is less than the area (or volume) of the U individual electrodes 51. Therefore, the area (or volume) of the UU individual electrodes 55 is also greater than the area (or volume) of the DD individual electrodes 45.

(UU Wiring Lines)

As is clear from FIGS. 4 and 5, in the present embodiment, the positions, shapes, and dimensions of the UU wiring lines 57 are the same as or similar to the positions, shapes, and dimensions of the DD wiring lines 47 (from another point of view, the U individual electrodes 51) except for the position in the D3 direction. Therefore, the above description of the DD wiring lines 47 may, for example, basically be applied to the UU wiring lines 57.

For example, the UU wiring lines 57 may connect the UU individual electrodes 55 that are adjacent to each other in the D2 direction. In addition, for example, the UU wiring lines 57 may extend straight in the D2 direction and have a generally constant width. The width of the UU wiring lines 57 is less than the maximum diameter of the UU individual electrodes 55 in the width direction of the UU wiring lines 57 so that gaps are provided between the UU individual electrodes 55.

Unlike the illustrated example, the positions, shapes, and dimensions of the UU wiring lines 57 may not be the same as or similar to the positions, shapes, and dimensions of the DD wiring lines 47. For example, the direction in which the UU wiring lines 57 extend may be a direction that crosses (for example, that is orthogonal to) the direction in which the DD wiring lines 47 extend. Also when the positions, shapes, and dimensions are not the same or similar, the description of the DD wiring lines 47 may be applied to the UU wiring lines 57.

(Pads)

As shown by the dotted lines in FIG. 5, each pad 59 is positioned to overlap an end portion of a corresponding one of the U wiring lines 53. As illustrated in FIG. 3, each pad 59 is individually connected to the corresponding U wiring line 53 by a corresponding one of the through conductors 61 that extend through the U piezoelectric layer 41. Thus, a driving signal may be input to each U individual electrode 51 from the outside of the piezoelectric actuator 13 through the corresponding pad 59.

As described above, each of the layers that constitute the piezoelectric actuator 13 may be made of different materials in different regions. In the UU conductor layer 43, the entirety of each pad 59 or a portion thereof adjacent to the upper surface may be made of a material that differs from the material of the UU individual electrodes 55.

(Connection between Rows of Individual Electrodes)

Figure 6:
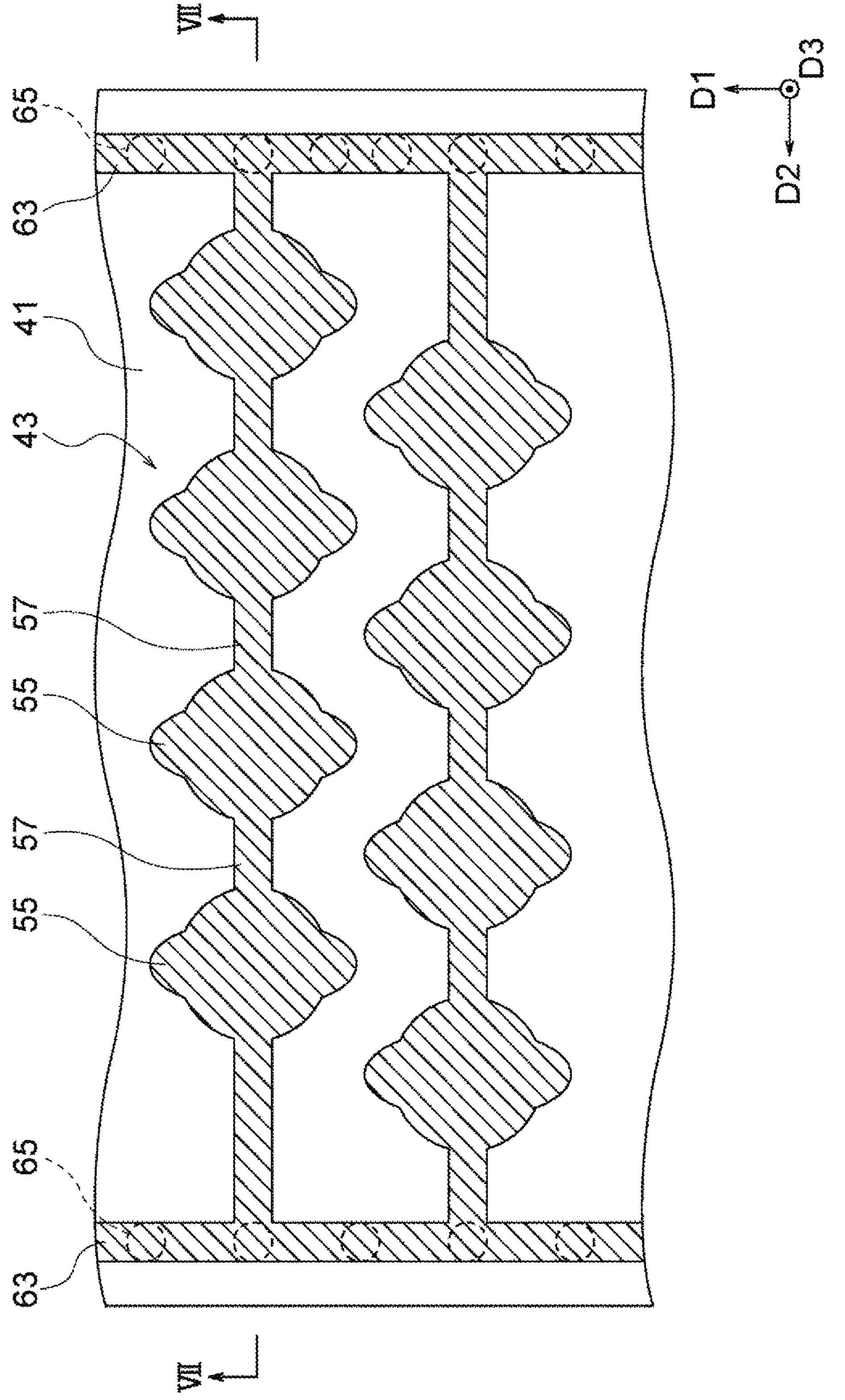
FIG. 6 is a simplified plan view of a part of an upper surface of the piezoelectric actuator illustrated in FIG. 4.

FIG. 6 is an enlarged plan view illustrating a portion of the UU conductor layer 43. This figure illustrates only two rows in which the UU individual electrodes 55 are arranged in the D2 direction. In addition, in this figure, it is assumed that each row includes four UU individual electrodes 55 for convenience of description. The pads 59 are not illustrated.

The rows of the UU individual electrodes 55 are, for example, connected to each other. The method of connection may be any appropriate method. In the illustrated example, each row has the UU wiring lines 57 that extend toward the outside of the rows (toward the positive and negative D2 sides) at both ends thereof. The UU wiring lines 57 at both ends are connected to common wiring lines 63 that extend in a direction (D1 direction) that crosses the rows. Thus, the rows are connected to each other.

Figure 7:
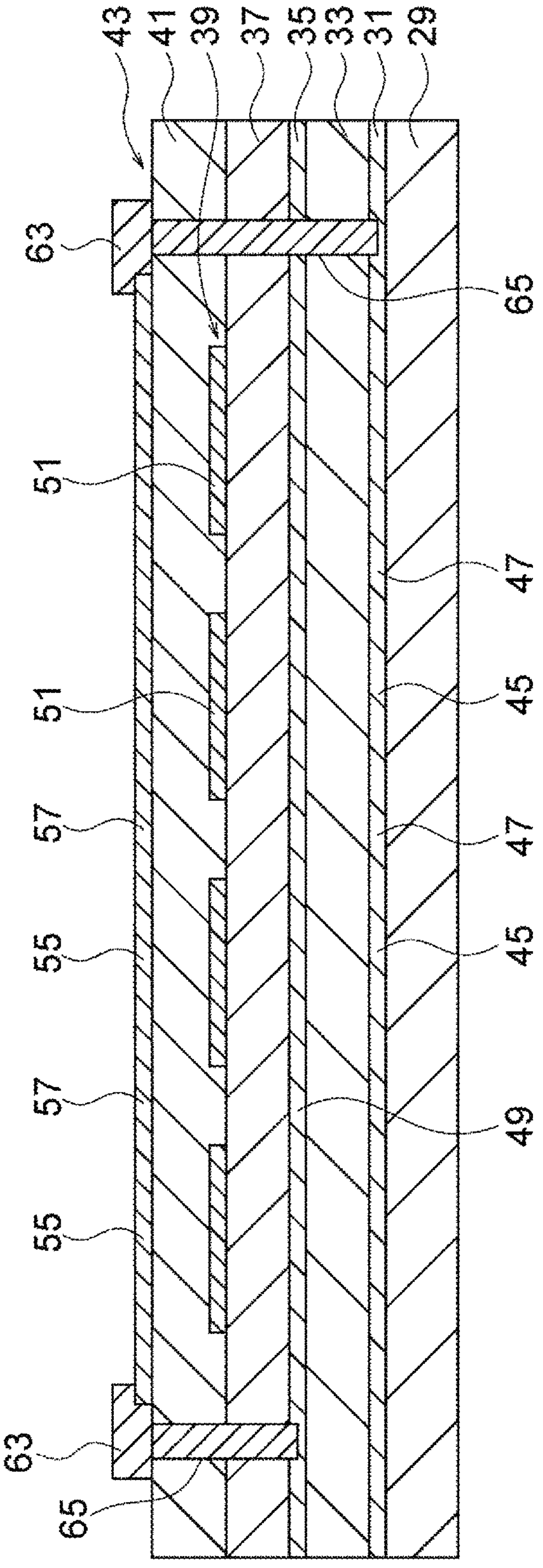
FIG. 7 is a sectional view of FIG. 6 taken along line VII-VII.

The common wiring lines 63 are portions of the UU conductor layer 43. In the description of the present embodiment, the common wiring lines 63 are distinguished from the UU wiring lines 57. However, similarly to the UU wiring lines 57, the common wiring lines 63 may be regarded as wiring lines that connect the UU individual electrodes 55 to each other. The material of the common wiring lines 63 may be the same as or different from the material of the UU conductor layer 43 in other regions (for example, the UU individual electrodes 55 and the UU wiring lines 57). In FIG. 7 described below, it is assumed that the materials are different.

As is clear from the above description, unlike the illustrated example, the rows of the UU individual electrodes 55 may be connected to each other by the UU wiring lines 57 that extend in the D1 direction or a direction at an angle with respect to the D1 direction. These UU wiring lines 57 may be provided for all of the UU individual electrodes 55 or only for some of the UU individual electrodes 55 in each row (for example, the UU individual electrodes 55 at both ends). As is clear from the description given below, the rows may be connected to each other through another conductor layer (for example, the D conductor layer 35).

Although connection between the rows of the UU individual electrodes 55 is described above, the rows of the DD individual electrodes 45 may also be similarly connected.

(Connection to Outside)

As described above, the U individual electrodes 51 are connected to the pads 59 by the U wiring lines 53 and the through conductors 61, and are thereby connectable to the outside of the piezoelectric actuator 13. Similarly, the other electrodes (the common electrode 49 and the DD individual electrodes 45) may also be connected to the outside of the piezoelectric actuator 13 by through conductors that extend through the insulating layers (including piezoelectric layers). In this case, the through conductors may be provided individually for different conductor layers or shared by conductor layers having the same potential. When the through conductors are shared, the electrodes having the same potential (for example, the common electrode 49, the DD individual electrodes 45, and the UU individual electrodes 55) may be connected to each other by the through conductors. An example of this case will now be described.

FIG. 7 is a sectional view of FIG. 6 taken along line VII-VII.

As illustrated in FIGS. 6 and 7, through conductors 65 that extend through the insulating layers are provided directly below the common wiring lines 63. As illustrated in the right side of FIG. 7, for example, each through conductor 65 may extend through the U piezoelectric layer 41, the piezoelectric layer 37, and the D insulating layer 33, and be connected to the corresponding common wiring line 63, the common electrode 49, and the DD conductor layer 31 (more specifically, a common wiring line similar to the common wiring line 63). Thus, the UU individual electrodes 55, the common electrode 49, and the DD individual electrodes 45 are electrically connected to each other.

As illustrated in the left side of FIG. 7, in addition to or in place of the above-described through conductors 65, through conductors 65 that extend only through the U piezoelectric layer 41 and the piezoelectric layer 37 and that electrically connect the UU individual electrodes 55 and the common electrode 49 to each other may be provided. Similarly, although not illustrated in particular, through conductors 65 that extend only through the D insulating layer 33 and that electrically connect the common electrode 49 and the DD individual electrodes 45 to each other may also be provided.

As shown by the dotted lines in FIG. 6, the through conductors 65 may, for example, be arranged along the common wiring lines 63. In this case, the potential of the electrodes having the same potential is stabilized. Alternatively, only one through conductor 65 may, of course, be provided at one location.

(Plan-View Shape of Pressurizing Chambers)

Figure 8:
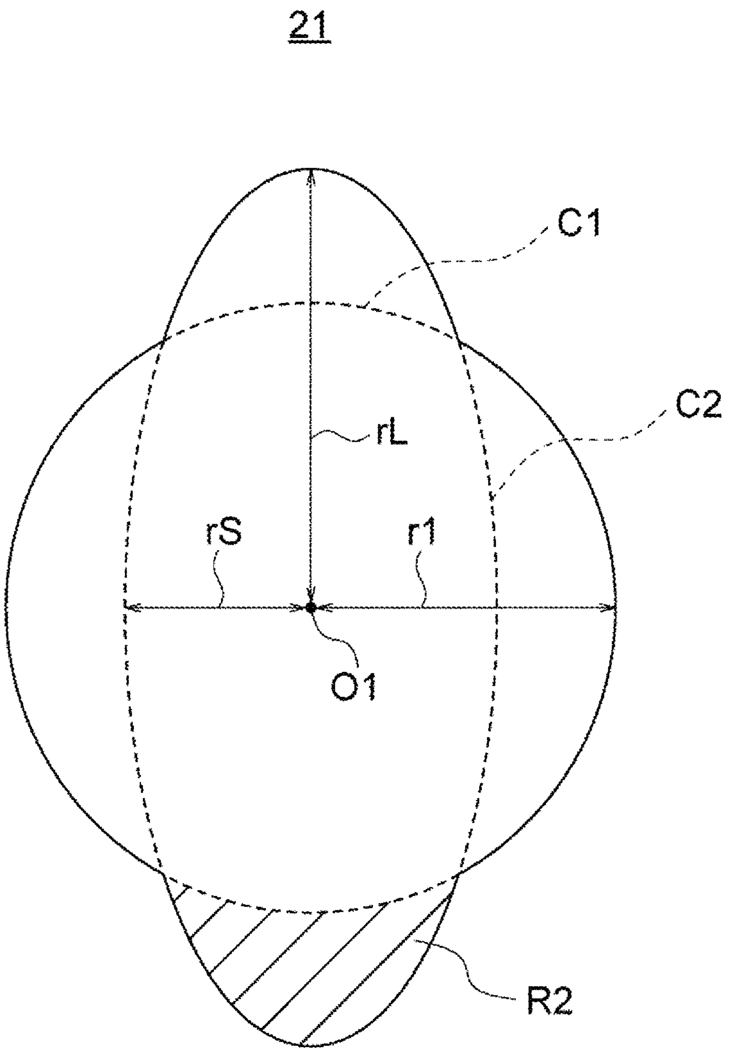
FIG. 8 is a schematic diagram illustrating the plan-view shape of a pressurizing chamber in the liquid discharge head illustrated in FIG. 2.

FIG. 8 is a plan view of each pressurizing chamber 21.

The plan-view shape of the pressurizing chamber 21 is, for example, the shape of a combination of a region having a circular shape C1 and regions R2 (one of the regions R2 is cross-hatched) that project from the region having the circular shape C1 toward both sides in a predetermined direction (up-down direction in the figure). The outer edge of each region R2 at the side opposite to the side adjacent to the circular shape C1 (outer edge shown by the solid line) is an outwardly convex curve. The curvature of this curve (average curvature when the curvature is not constant) is, for example, greater than the curvature of the circular shape C1.

The above-described plan-view shape of the pressurizing chamber 21 may be regarded as the shape of a combination of a region in which the circular shape C1 and an elliptical shape C2 overlap (region surrounded by the dotted lines) and regions in which the circular shape C1 and the elliptical shape C2 do not overlap (regions surrounded by the solid and dotted lines). In other words, when the circular shape C1 and the elliptical shape C2 are regarded as closed curves in a Venn diagram, the plan-view shape of the pressurizing chamber 21 corresponds to the union (from another point of view, the logical sum).

More specifically, the center of the circular shape C1 and the center of the elliptical shape C2 coincide with each other (see center O1). The semi-major axis rL of the elliptical shape C2 is greater than the radius r1 of the circular shape C1, and the semi-minor axis rS of the elliptical shape C2 is less than the radius r1 of the circular shape C1. The regions R2 at both ends of the elliptical shape C2 in the long direction are positioned outside the circular shape C1.

The outer edge of each region R2 at the side opposite to the side adjacent to the circular shape C1 (outer edge shown by the solid line) may instead have a constant curvature. In other words, the regions R2 may have shapes that are portions of circular shapes with a radius less than the radius of the circular shape C1 instead of end portions of an ellipse.

The dimensions of the above-described shapes (for example, the relative lengths of the radius r1, the semi-major axis rL, and the semi-minor axis rS) may be set as appropriate. Examples of the dimensions will now be described. The semi-major axis rL may be greater than or equal to 1.2 times and less than or equal to 1.8 times the radius r1. The radius of curvature determined from the average curvature of the outer edge of each region R2 at the side opposite to the side adjacent to the circular shape C1 may be greater than or equal to 0.3 times and less than or equal to 0.6 times the radius r1.

As described above, the pressurizing chambers 21, the U individual electrodes 51, the DD individual electrodes 45, and the UU individual electrodes 55 may have similar plan-view shapes. Therefore, the above description of the plan-view shape of the pressurizing chambers 21 may be applied to the plan-view shapes of the U individual electrodes 51, the DD individual electrodes 45, and the UU individual electrodes 55.

(Other Structures of Head)

Although not illustrated in particular, each head 2 may include a housing, a driver IC, a wiring board, etc. in addition to the head body 7. The driver IC, for example, supplies electric power to the head body 7 through an FPC (not illustrated) based on a control signal from the control unit 88. For example, the control unit 88 controls the driver IC (head 2) so that the reference potential is applied to the common electrode 49, the DD individual electrodes 45, and the UU individual electrodes 55 and that a driving signal having a potential that varies with respect to the reference potential is input to each of the U individual electrodes 51 individually. In addition, the head body 7 may include an additional flow passage member that supplies liquid to the flow passage member 11. The additional flow passage member may also contribute to supporting other members or fixing the head 2 to the frame 70.

(Method for Manufacturing Piezoelectric Actuator)

The piezoelectric actuator 13 may be manufactured by applying a known method as appropriate. For example, four ceramic green sheets used to form the four insulating layers (29, 33, 37, and 41) are prepared. Conductive paste is applied to upper and lower surfaces of the ceramic green sheets to form the four conductor layers (31, 35, 39, and 43). Through holes are formed in the ceramic green sheets, and are filled with conductive paste to form the through conductors (61 and 65). Then, the four ceramic green sheets are stacked together and fired.

The above-described example of the manufacturing method may be changed as appropriate. For example, the UU conductor layer 43 may be formed on the upper surface of the U piezoelectric layer 41 by deposition or sputtering after the ceramic green sheets that form the insulating layers (29, 33, 37, and 41) and the conductive paste that forms the other conductors (31, 35, 39, 61, and 65) are fired.

As described above, according to the present embodiment, the piezoelectric actuator 13 has the first surface 13*a* and the second surface 13*b* that faces away from the first surface 13*a*, and includes the piezoelectric elements 27 at a plurality of positions along the first surface 13*a*. The piezoelectric actuator 13 includes the piezoelectric layer 37, the common electrode 49, a plurality of first individual electrodes (U individual electrodes 51), a first insulating layer (D insulating layer 33), and a plurality of second individual electrodes (DD individual electrodes 45). The piezoelectric layer 37 extends along the first surface 13*a*. The common electrode 49 is provided on the piezoelectric layer 37 at a side adjacent to the first surface 13*a*, and extends over the piezoelectric elements 27. The U individual electrodes 51 are provided on the piezoelectric layer 37 at a side adjacent to the second surface 13*b*, and positioned individually at the piezoelectric elements 27. The U individual electrodes 51 are not electrically connected to each other. The D insulating layer 33 is provided on the common electrode 49 at a side adjacent to the first surface 13*a*, and extends over the piezoelectric elements 27. The DD individual electrodes 45 are provided on the D insulating layer 33 at a side adjacent to the first surface 13*a*, and positioned individually at the piezoelectric elements 27. The DD individual electrodes 45 overlap centers of the U individual electrodes in see-through plan view. The DD individual electrodes 45 are electrically connected to each other.

Accordingly, for example, unintended stress and/or strain can be reduced in the piezoelectric actuator 13. This will be described in more detail. In the following description, components according to a technology that is not the technology of the present disclosure may be denoted by the same reference signs as those in the present embodiment for convenience.

The piezoelectric actuator 13 includes a vibrating plate (the D insulating layer 33 and/or the DD insulating layer 29 in the present embodiment) to regulate expansion and/or contraction of the piezoelectric layer 37 in a planar direction and cause a bending deformation when a voltage is applied to the piezoelectric layer 37. The vibrating plate and the piezoelectric layer 37 (and a layer thereabove, which is the U piezoelectric layer 41 in the present embodiment) may, for example, be made of the same material (from another point of view, have the same Young's modulus) and have the same thickness. A reason for this is to appropriately set the strength by which the expansion and/or contraction of the piezoelectric layer 37 in a planar direction is regulated.

Another reason is to reduce the probability of occurrence of unintended bending deformation due to a difference in expansion in a planar direction between the piezoelectric layer 37 and the vibrating plate caused by a temperature change. The common electrode 49 is typically disposed between the piezoelectric layer 37 and the vibrating plate. A reason for this is to simplify the wiring structure of the piezoelectric actuator 13 (for example, to reduce the number of through conductors).

In the above-described structure, the common electrode 49 is disposed near the center of the piezoelectric actuator 13 in the thickness direction. From another point of view, the common electrode 49 is disposed near a neutral plane of the piezoelectric actuator 13. The neutral plane is a boundary plane between a region in which a compressive stress is generated at a side adjacent to a concavely curved surface (one of the first surface 13*a* and the second surface 13*b*) and a region in which a tensile stress is generated at a side adjacent to a convexly curved surface (other of the first surface 13*a* and the second surface 13*b*) when the piezoelectric actuator 13 is bent. When the Young's modulus is uniform or horizontally symmetrical in cross section of the piezoelectric actuator 13, the neutral plane passes through the barycenter of the cross section. The location near the center or the neutral plane is, for example, a location at which the distance from the center or the neutral plane is in the range of less than ¼ or less than ⅛ of the thickness of the piezoelectric actuator 13.

A piezoelectric actuator including only the common electrode 49 and the U conductor layer 39 as conductor layers, unlike the present embodiment, will now be discussed. Assume that each layer of this piezoelectric actuator expands and/or contracts in response to a temperature change. In this case, since the insulating layer positioned closer to the first surface 13*a* than the common electrode 49 and the insulating layer provided closer to the second surface 13*b* than the common electrode 49 are made of the same or similar materials and have the same or similar thicknesses as described above, the expansions and/or contractions thereof easily balance each other. In contrast, the U conductor layer 39 is the only conductor layer positioned closer to the second surface 13*b* than the common electrode 49. As a result, the expansion and/or contraction of the U conductor layer 39 in a planar direction leads to a large difference in expansion and/or contraction of the piezoelectric actuator 13 in a planar direction between the regions closer to the first surface 13*a* and the second surface 13*b* than the common electrode 49. As a result, the probability of occurrence of unintended stress and/or strain is increased.

Assume that, for example, the piezoelectric actuator 13 is produced by firing ceramic green sheets. In this case, when the temperature of the piezoelectric actuator 13 is reduced after the firing process, the U conductor layer 39 contracts in a planar direction and applies a compressive force in a planar direction to the insulating layers (for example, the piezoelectric layer 37 and the D insulating layer 33) having coefficients of linear expansion less than that of the U conductor layer 39. As a result, there is a high probability that the piezoelectric actuator 13 will be bent concavely at the side adjacent to the U conductor layer 39. Even when the bending deformation does not occur, there is a possibility that unintended stress will be generated in a direction for causing such a bending deformation. Due to the bending deformation and/or stress, for example, the amount by which each piezoelectric element 27 is bent (displacement) may, for example, greatly differ from the intended amount when a voltage is applied to the piezoelectric element 27.

In contrast, according to the present embodiment, the DD individual electrodes 45 are provided at a side of the common electrode 49 opposite to the side at which the U individual electrodes 51 are provided. Therefore, the difference in expansion and/or contraction between the side of the common electrode 49 at which the U individual electrodes 51 are provided and the side opposite thereto can be easily reduced. As a result, for example, the accuracy of the amount by which each piezoelectric element 27 is bent when a voltage is applied to the piezoelectric element 27 can be increased.

The DD conductor layer 31, which is provided at a side of the common electrode 49 opposite to the side at which the U individual electrodes 51 are provided, includes the DD individual electrodes 45 that individually overlap the centers of the U individual electrodes 51. Therefore, compared to an embodiment in which, for example, the DD conductor layer 31 extends over the piezoelectric elements 27 without gaps therein, the areas of conductor layers provided above and below the common electrode 49 can be more easily made equal to each other. In addition, compared to a case in which the DD individual electrodes 45 do not overlap the centers of the U individual electrodes 51, the amounts of expansion and/or contraction in a planar direction in regions above and below the common electrode 49 can be more easily made equal to each other in each piezoelectric element 27 (from another point of view, in a local region). As a result, the effect of increasing the accuracy of the amount by which each piezoelectric element 27 is bent can be enhanced.

In the above description of an example of the effect, it is assumed that the common electrode 49 is positioned near the neutral plane. However, it is not necessary that the common electrode 49 be disposed at such a position. For example, the effect may be interpreted conversely to the above description. More specifically, for example, since the expansion and/or contraction in a planar direction is balanced between the conductor layers closer to the first surface 13*a* and the second surface 13*b* than the common electrode 49, the materials and thicknesses of the insulating layers (for example, the piezoelectric layer 37 and the D insulating layer 33) can be more easily selected and designed. In addition, when an additional layer (for example, a conductor layer for returning the polarization to an initial state) is provided, the design thereof can be facilitated.

In the present embodiment, the piezoelectric actuator 13 includes a plurality of first wiring lines (U wiring lines 53) and a plurality of second wiring lines (DD wiring lines 47). The U wiring lines 53 are provided on the piezoelectric layer 37 at a side adjacent to the second surface 13*b*, and are individually connected to the plurality of first individual electrodes (U individual electrodes 51). The DD wiring lines 47 are provided on the first insulating layer (D insulating layer 33) at a side adjacent to the first surface 13*a*, and connect the plurality of second individual electrodes (DD individual electrodes 45) to each other. The direction in which the U wiring lines 53 individually extend from the U individual electrodes 51 and the direction in which the DD wiring lines 47 individually extend from the DD individual electrodes 45 cross each other.

In this case, compared to an embodiment in which, for example, the U wiring lines 53 and the DD wiring lines 47 are parallel (this embodiment may also be included in the technology of the present disclosure), the amount of expansion and/or contraction of the U conductor layer 39 in the direction in which the U wiring lines 53 extend is closer to the amount of expansion and/or contraction of the DD conductor layer 31 in the direction in which the DD wiring lines 47 extend. As a result, for example, the amount of expansion and/or contraction of the piezoelectric actuator 13 in one of the directions that cross each other is closer to the amount of expansion and/or contraction in the other of the directions that cross each other. Accordingly, the probability that strain of the piezoelectric actuator 13 will occur in a certain direction in plan view is reduced. In addition, for example, the probability that bending moment of the piezoelectric elements 27 will be increased in a certain direction (direction in which the wiring lines extend) can be reduced. When the U wiring lines 53 and the DD wiring lines 47 are parallel, the above-described expansion and/or contraction in a planar direction can be easily balanced between the upper and lower regions.

In addition, in the present embodiment, each of the plurality of second individual electrodes (DD individual electrodes 45) has an elongated shape that extends in a long direction in plan view. The plurality of second wiring lines (DD wiring lines 47) extend from the DD individual electrodes 45 in a direction that crosses the long direction of the DD individual electrodes 45.

In this case, compared to an embodiment in which, for example, the DD wiring lines 47 extend in the long direction of the DD individual electrodes 45 (this embodiment may also be included in the technology of the present disclosure), the total amount of expansion and/or contraction of the DD individual electrodes 45 and the DD wiring lines 47 in the long direction of the DD individual electrodes 45 and that in the short direction of the DD individual electrodes 45 are closer to each other. As a result, for example, strain of each piezoelectric element 27 in plan view can be reduced.

In addition, in the present embodiment, the piezoelectric actuator 13 further includes a second insulating layer (U piezoelectric layer 41) and a plurality of third individual electrodes (UU individual electrodes 55). The U piezoelectric layer 41 is provided on the piezoelectric layer 37 from above the plurality of first individual electrodes (U individual electrodes 51). The UU individual electrodes 55 are provided on the U piezoelectric layer 41 at a side adjacent to the second surface 13*b*. The UU individual electrodes 55 are positioned individually at the piezoelectric elements 27 and electrically connected to each other. The total area of the plurality of second individual electrodes (DD individual electrodes 45) and the plurality of second wiring lines (DD wiring lines 47) is greater than the total area of the U individual electrodes 51 and the plurality of first wiring lines (U wiring lines 53).

In this case, compared to an embodiment in which the UU individual electrodes 55 are not provided (this embodiment may also be included in the technology of the present disclosure), the area of the DD conductor layer 31 can be easily increased without sacrificing the balance of expansion and/or contraction in a planar direction between the upper and lower regions that are closer to the first surface 13*a* and the second surface 13*b* than the common electrode 49. As a result, for example, the design flexibility can be increased. For example, since the DD wiring lines 47 tend to be longer than the U wiring lines 53, to bring the areas of the U conductor layer 39 and the DD conductor layer 31 closer to each other, the DD individual electrodes 45 are made smaller than the U individual electrodes 51, or the thickness of the DD wiring lines 47 is reduced. However, since the UU individual electrodes 55 are provided, the thickness of the DD wiring lines 47 can be sufficiently increased to stabilize the potential of the DD individual electrodes 45 without sacrificing the balance of expansion and/or contraction in a planar direction between the upper and lower regions. In addition, since the UU individual electrodes 55 are provided for the respective piezoelectric elements 27, the balance of expansion and/or contraction between the UU individual electrodes 55, the U individual electrodes 51, and the DD individual electrodes 45 can be easily calculated.

In addition, in the present embodiment, the second insulating layer is a layer (U piezoelectric layer 41) that is piezoelectric and that differs from the piezoelectric layer 37.

In this case, as described above, for example, the force for bending the piezoelectric actuator 13 can be increased. When the U piezoelectric layer 41 and the UU conductor layer 43 are provided to increase the force for bending the piezoelectric actuator 13, the amount of the conductor layers in the region closer to the second surface 13*b* than the common electrode 49 is increased, and there is an increased probability that the above-described unintended bending deformation will occur. Therefore, it is advantageous to provide the DD individual electrodes 45 having the above-described effects.

In addition, in the present embodiment, the area of each of the plurality of second individual electrodes (DD individual electrodes 45) is less than the area of each of the plurality of first individual electrodes (U individual electrodes 51).

In this case, compared to an embodiment in which, for example, the area of each DD individual electrode 45 is greater than the area of each U individual electrode 51 (this embodiment may also be included in the technology of the present disclosure), there is a lower probability that the amount by which each piezoelectric element 27 is bent when a voltage is applied to the piezoelectric element 27 will be reduced by the corresponding DD individual electrode 45.

In addition, in the present embodiment, the shape of each of the plurality of second individual electrodes (DD individual electrodes 45) is similar to the shape of each of the plurality of first individual electrodes (U individual electrodes 51) in a see-through plan view of the first surface 13*a*.

In this case, in each of the piezoelectric elements 27, for example, the difference or ratio between the amount of expansion and/or contraction in a planar direction at the upper side and the amount of expansion and/or contraction in a planar direction at the lower side can be easily made uniform in various directions in plan view. In other words, the influence of the DD individual electrodes 45 can be easily made uniform. As a result, for example, there is a lower probability that each piezoelectric element 27 will be bent into a shape that differs from the intended shape when a voltage is applied to the piezoelectric element 27.

In addition, in the present embodiment, the shape of each of the plurality of first individual electrodes (U individual electrodes 51) is the shape of the combination of the region having the circular shape C1 and the regions R2 that project from the region having the circular shape C1 toward both sides in a predetermined direction in a plan view of the first surface 13*a*.

In this case, compared to an embodiment in which, for example the U individual electrodes 51 have the circular shape C1 (this embodiment may also be included in the technology of the present disclosure), the area of the U individual electrodes 51 can be increased. As a result, for example, the displacement of the piezoelectric elements 27 can be increased. In addition, the density of the U individual electrodes 51 in the short direction can be made equal to that in the embodiment in which the U individual electrodes 51 have the circular shape C1. From another point of view, the probability that the U individual electrodes 51 will be short-circuited to each other due to displacement of the U individual electrodes 51 can be reduced.

Each liquid discharge head 2 according to the present embodiment includes the piezoelectric actuator 13 according to the present embodiment and the flow passage member 11. The flow passage member 11 has the pressurizing surface 11*b* that is provided adjacent to the first surface 13*a* or the second surface 13*b* (first surface 13*a* in the present embodiment) of the piezoelectric actuator 13 and the discharge surface 11*a* that faces away from the pressurizing surface 11*b*. The flow passage member 11 includes the pressurizing chambers 21 and the discharge holes 3. The pressurizing chambers 21 individually overlap the piezoelectric elements 27 in a see-through plan view of the pressurizing surface 11*b*. The discharge holes 3 are individually connected to the pressurizing chambers 21 and open in the discharge surface 11*a*.

Accordingly, for example, the unintended stress and/or strain is reduced in the piezoelectric actuator 13 as described above, so that the pressure applied to the pressurizing chambers 21 is stabilized. Accordingly, the accuracy of liquid droplets discharged from the discharge holes 3 is increased.

In addition, in the present embodiment, the shape of each of the plurality of second individual electrodes (DD individual electrodes 45) is similar to the shape of each of the pressurizing chambers 21 in the see-through plan view of the first surface 13*a*.

The piezoelectric elements 27 are supported by the outer peripheries of the pressurizing chambers 21. In an embodiment in which the shape of each DD individual electrode 45 is not similar to the shape of each pressurizing chamber 21 (this embodiment may also be included in the technology of the present disclosure), there is a high probability that the difference or ratio between the diameter of each DD individual electrode 45 and the diameter of each pressurizing chamber 21 will vary depending on the direction in plan view. As a result, there is a high probability that each piezoelectric element 27 will be bent into a shape that differs from the intended shape. In the present embodiment, this probability is reduced. The DD individual electrodes 45 are closer to the pressurizing chambers 21 than any other electrodes. Therefore, it is advantageous to form each DD individual electrode 45 in a shape similar to that of each pressurizing chamber 21.

In the above-described embodiment, the U individual electrodes 51 are examples of the first individual electrodes. The D insulating layer 33 is an example of the first insulating layer. The DD individual electrodes 45 are examples of the second individual electrodes. The U wiring lines 53 are examples of the first wiring lines. The DD wiring lines 47 are examples of the second wiring lines. The U piezoelectric layer 41 is an example of the second insulating layer. The UU individual electrodes 55 are examples of the third individual electrodes.

The technology of the present disclosure is not limited to the above-described embodiment, and may be implemented in various modes.

For example, the piezoelectric actuator may be applied to a device other than the liquid discharge head, such as a device that generates ultrasonic waves. In addition, the combination of the U piezoelectric layer 41 and the UU conductor layer 43 may be omitted, and the DD insulating layer 29 may also be omitted. Although the piezoelectric actuator 13 is used to apply a pressure at the side adjacent to the first surface 13*a* in the above-described embodiment, the piezoelectric actuator 13 may instead be used to apply a pressure at the side adjacent to the second surface 13*b*.

The invention claimed is:

1. A piezoelectric actuator having a first surface and a second surface that faces away from the first surface and having a plurality of piezoelectric elements at a plurality of positions along the first surface, the piezoelectric actuator comprising:

a piezoelectric layer that extends along the first surface;

a common electrode that is provided on the piezoelectric layer at a side adjacent to the first surface and that extends over the plurality of piezoelectric elements;

a plurality of first individual electrodes that are provided on the piezoelectric layer at a side adjacent to the second surface, opposite the common electrode, that are positioned individually at the plurality of piezoelectric elements, and that are not electrically connected to each other;

a first insulating layer that is provided on the common electrode at the side adjacent to the first surface, opposite the piezoelectric layer, and that extends over the plurality of piezoelectric elements; and a plurality of second individual electrodes, each second individual electrode among the plurality of second individual electrodes is provided on the first insulating layer at the side adjacent to the first surface, opposite the common electrode, is positioned individually at the plurality of piezoelectric elements, individually overlaps centers of the plurality of first individual electrodes in a see-through plan view, and is electrically connected to each other.

2. The piezoelectric actuator according to claim 1, further comprising:

a plurality of first wiring lines that are provided on the piezoelectric layer at the side adjacent to the second surface and that are individually connected to the plurality of first individual electrodes; and a plurality of second wiring lines that are provided on the first insulating layer at the side adjacent to the first surface and that connect the plurality of second individual electrodes to each other, wherein a direction in which the plurality of first wiring lines individually extend from the plurality of first individual electrodes crosses a direction in which the plurality of second wiring lines individually extend from the plurality of second individual electrodes.

3. The piezoelectric actuator according to claim 2, wherein each of the plurality of second individual electrodes has an elongated shape that extends in a long direction in a plan view, and wherein the plurality of second wiring lines extend from the plurality of second individual electrodes in another direction that crosses the long direction.

4. The piezoelectric actuator according to claim 2, further comprising:

a second insulating layer that is provided on the piezoelectric layer and that extends over the plurality of first individual electrodes; and a plurality of third individual electrodes that are provided on the second insulating layer at the side adjacent to the second surface, that are positioned individually at the plurality of piezoelectric elements, and that are electrically connected to each other, wherein a total area of the plurality of second individual electrodes and the plurality of second wiring lines is greater than a total area of the plurality of first individual electrodes and the plurality of first wiring lines.

5. The piezoelectric actuator according to claim 4, wherein the second insulating layer is piezoelectric and differs from the piezoelectric layer.

6. The piezoelectric actuator according to claim 1, wherein an area of each of the plurality of second individual electrodes is less than an area of each of the plurality of first individual electrodes.

7. The piezoelectric actuator according to claim 1, wherein a shape of each of the plurality of second individual electrodes is similar to a shape of each of the plurality of first individual electrodes in the see-through plan view.

8. The piezoelectric actuator according to claim 1, wherein a shape of each of the plurality of first individual electrodes is a combination of a circular region and regions that project from both sides of the circular region in a predetermined direction in the see-through plan view.

9. A liquid discharge head comprising:

the piezoelectric actuator according to claim 1; and a flow passage member having a pressurizing surface provided on the first surface or the second surface, and a discharge surface that faces away from the pressurizing surface, wherein the flow passage member includes a plurality of pressurizing chambers that individually overlap the plurality of piezoelectric elements in the see-through plan view, and a plurality of discharge holes that are individually connected to the plurality of pressurizing chambers and that open in the discharge surface.

10. The liquid discharge head according to claim 9, wherein a shape of each of the plurality of second individual electrodes is similar to a shape of each of the plurality of pressurizing chambers in the see-through plan view of the first surface.

11. A recording device comprising:

the liquid discharge head according to claim 9; and a control unit that is electrically connected to the liquid discharge head and that controls an operation of applying a reference potential to the common electrode and the plurality of second individual electrodes, and that individually inputs a driving signal to each of the plurality of first individual electrodes.

* * * * *